(12) United States Patent
Manolakos et al.

(10) Patent No.: US 11,496,988 B2
(45) Date of Patent: Nov. 8, 2022

(54) SIGNALING DETAILS FOR PRS STITCHING FOR POSITIONING IN A WIRELESS NETWORK

(71) Applicant: QUALCOMM Incorporated, San Diego, CA (US)

(72) Inventors: Alexandros Manolakos, Escondido, CA (US); Wanshi Chen, San Diego, CA (US); Krishna Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/103,725

(22) Filed: Nov. 24, 2020

(65) Prior Publication Data

US 2021/0185632 A1 Jun. 17, 2021

Related U.S. Application Data

(60) Provisional application No. 62/948,641, filed on Dec. 16, 2019.

(51) Int. Cl.
*H04W 72/06* (2009.01)
*H04W 64/00* (2009.01)
(Continued)

(52) U.S. Cl.
CPC ......... *H04W 64/003* (2013.01); *H04L 1/0013* (2013.01); *H04W 72/042* (2013.01);
(Continued)

(58) Field of Classification Search
CPC ............. H04W 64/003; H04W 64/006; H04W 72/042; H04W 72/0446; H04W 72/06;
(Continued)

(56) References Cited

U.S. PATENT DOCUMENTS

2016/0223639 A1* 8/2016 Davydov ................ H04L 5/001
2017/0201960 A1 7/2017 Park et al.
(Continued)

OTHER PUBLICATIONS

International Search Report and Written Opinion—PCT/US2020/062278—ISA/EPO—dated Mar. 10, 2021.

*Primary Examiner* — Siu M Lee
(74) *Attorney, Agent, or Firm* — Thien T. Nguyen

(57) ABSTRACT

A wireless entity, such as a user equipment (UE) or transmission reception point (TRP), receives and processes aggregated positioning reference signals (PRS) to increase the effective PRS bandwidth, thereby increasing positioning accuracy, such as time of arrival measurements. An aggregated PRS includes one or more PRS components that are transmitted from a same transmitting entity. Each PRS component may be, e.g., a separate PRS resource associated with a contiguous frequency-domain bandwidth or may be, e.g., a plurality of frequency-domain bandwidths spanned by a single PRS resource. PRS components of an aggregated PRS that are unpunctured, e.g., do not collide with higher priority signals, are aligned in time domain, and are configured with common constraints are processed jointly assuming that the PRS components are transmitted from a same antenna port, thereby increasing the effective PRS bandwidth.

48 Claims, 18 Drawing Sheets

(51) Int. Cl.
  *H04L 1/00* (2006.01)
  *H04W 72/04* (2009.01)
  *H04W 72/10* (2009.01)
(52) U.S. Cl.
  CPC ....... *H04W 72/0446* (2013.01); *H04W 72/06* (2013.01); *H04W 72/10* (2013.01)
(58) Field of Classification Search
  CPC .. H04W 72/10; H04W 88/085; H04L 1/0013; H04L 5/001; H04L 5/0048; H04L 5/0094; H04L 27/261; G01S 8/0205
  See application file for complete search history.

(56) References Cited

U.S. PATENT DOCUMENTS

| | | | |
|---|---|---|---|
| 2019/0327707 A1 | 10/2019 | Agnihotri et al. | |
| 2021/0076359 A1* | 3/2021 | Sosnin | G01S 19/42 |
| 2021/0167925 A1* | 6/2021 | Qi | H04L 5/005 |
| 2022/0038239 A1* | 2/2022 | Guo | G01S 5/0236 |

* cited by examiner

SIGNALING DETAILS FOR PRS STITCHING FOR POSITIONING IN A WIRELESS NETWORK

CLAIM OF PRIORITY UNDER 35 U.S.C. § 119

This application claims under 35 USC § 119 the benefit of and priority to U.S. Provisional Application No. 62/948,641, filed Dec. 16, 2019, and entitled "SIGNALING DETAILS FOR PRS STITCHING FOR POSITIONING IN A WIRELESS NETWORK," which is assigned to the assignee hereof and is incorporated herein by reference in its entirety.

BACKGROUND

Field

The subject matter disclosed herein relates to wireless communications systems, and more particularly to systems, methods, and devices that support positioning reference signaling.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Obtaining the location of a US that is accessing a wireless network may be useful for many applications including, for example, emergency calls, personal navigation, asset tracking, locating a friend or family member, etc. Location determination of a UE can require usage of resources by a network for transmitting downlink positioning reference signals (PRS) from network TRPs or receiving uplink sounding reference signals (SRS) from the UE that can be measured to obtain location measurements for the UE. The precision of the location measurements is proportional to the bandwidth of the positioning signals used. Moreover, the bandwidth of positioning signals, such as PRS and SRS, is currently limited, limiting the precision of current location measurements.

SUMMARY

A user equipment (UE) receives and processes aggregated downlink (DL) positioning reference signals (PRS) transmitted by a transmission reception point (TRP) to increase the effective PRS bandwidth, thereby increasing positioning accuracy, such as time of arrival measurements. An aggregated DL PRS includes one or more PRS components that are transmitted from a same TRP. Each PRS component may be, e.g., a separate PRS resource associated with a contiguous frequency-domain bandwidth or may be, e.g., a plurality of frequency-domain bandwidths spanned by a single PRS resource. PRS components of an aggregated DL PRS that are unpunctured, e.g., that are aligned in time and do not collide with higher priority signals, and are configured with common constraints are processed jointly by the UE assuming that the PRS components are transmitted from a same antenna port, thereby increasing the effective PRS bandwidth. An indication of relative transmission power between the PRS components of an aggregated DL PRS may be provided to the UE and used to process the PRS components.

In one implementation, a method for supporting positioning of a user equipment (UE) performed by a first wireless entity in a wireless network, includes receiving configurations for positioning reference signals (PRS) associated with one or more second wireless entities; receiving one or more aggregated PRS from the one or more second wireless entities, wherein each aggregated PRS comprise one or more PRS components transmitted from a same second entity, wherein each PRS component transmitted from the same second entity comprises a separate PRS resource associated with a contiguous frequency-domain bandwidth or comprises a plurality of frequency-domain bandwidths spanned by a single PRS resource; processing jointly unpunctured PRS components of the aggregated PRS that are aligned in time domain; performing positioning measurements using the processed aggregated PRS from the one or more second wireless entities; and transmitting location information based on the positioning measurements.

In one implementation, a first wireless entity configured to support positioning of a user equipment (UE) in a wireless network includes an external interface comprising at least one wireless transceiver configured to wirelessly communicate with entities in the wireless network; at least one memory; and at least one processor coupled to the at least one wireless transceiver and the at least one memory and configured to: receive, via the at least one wireless transceiver, configurations for positioning reference signals (PRS) associated with one or more second wireless entities; receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource; process jointly unpunctured PRS components of the aggregated PRS that are aligned in time domain; perform positioning measurements using the processed aggregated PRS from the one or more second wireless entities; and transmit, via the at least one wireless transceiver, location information based on the positioning measurements.

In one implementation, a first wireless entity configured to support positioning of a user equipment (UE) in a wireless network includes means for receiving configurations for positioning reference signals (PRS) associated with one or more second wireless entities; means for receiving one or more aggregated PRS from the one or more second wireless entities, wherein each aggregated PRS comprise one or more PRS components transmitted from a same second entity, wherein each PRS component transmitted from the same second entity comprises a separate PRS resource associated with a contiguous frequency-domain bandwidth or comprises a plurality of frequency-domain bandwidths spanned by a single PRS resource; means for processing jointly unpunctured PRS components of the aggregated PRS that are aligned in time domain; means for performing positioning measurements using the processed aggregated PRS from the one or more second wireless entities; and means for transmitting location information based on the positioning measurements.

In one implementation, a non-transitory storage medium including program code stored thereon, the program code is operable to configure at least one processor in a first wireless entity to support positioning of a user equipment (UE) in a wireless network includes program code to receive configurations for positioning reference signals (PRS) associated with one or more second wireless entities; program code to receive one or more aggregated PRS from the one or more second wireless entities, wherein each aggregated PRS comprise one or more PRS components transmitted from a same second entity, wherein each PRS component transmitted from the same second entity comprises a separate PRS resource associated with a contiguous frequency-domain bandwidth or comprises a plurality of frequency-domain bandwidths spanned by a single PRS resource; program code to process jointly unpunctured PRS components of the aggregated PRS that are aligned in time domain; program code to perform positioning measurements using the processed aggregated PRS from the one or more second wireless entities; and program code to transmit location information based on the positioning measurements.

In one implementation, a method for supporting positioning of a user equipment (UE) in a wireless network performed by a first wireless entity, includes receiving configurations for positioning reference signals (PRS) associated with one or more second wireless entities; receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource; receiving an indication of relative transmission power between the PRS components of each aggregated PRS transmitted from the same second wireless entity; processing jointly the one or more PRS components for each aggregated PRS at least based on the received indication of relative transmission power; performing positioning measurements using the processed aggregated PRS from the one or more second wireless entities; and transmitting location information based on the positioning measurements.

In one implementation, a first wireless entity configured to support positioning of a user equipment (UE) in a wireless network, includes an external interface comprising at least one wireless transceiver configured to wirelessly communicate with entities in the wireless network; at least one memory; and at least one processor coupled to the external interface and the at least one memory and configured to: receive, via the external interface, configurations for positioning reference signals (PRS) associated with one or more second wireless entities; receive, via the external interface, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource; receive, via the external interface, an indication of relative transmission power between the PRS components of each aggregated PRS transmitted from the same second wireless entity; process jointly the one or more PRS components for each aggregated PRS at least based on the received indication of relative transmission power; perform positioning measurements using the processed aggregated PRS from the one or more second wireless entities; and transmit, via the external interface, location information based on the positioning measurements.

In one implementation, a first wireless entity configured to support positioning of a user equipment (UE) in a wireless network, includes means for receiving configurations for positioning reference signals (PRS) associated with one or more second wireless entities; means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource; means for receiving an indication of relative transmission power between the PRS components of each aggregated PRS transmitted from the same second wireless entity; means for processing jointly the one or more PRS components for each aggregated PRS at least based on the received indication of relative transmission power; means for performing positioning measurements using the processed aggregated PRS from the one or more second wireless entities; and means for transmitting location information based on the positioning measurements.

In one implementation, a non-transitory storage medium including program code stored thereon, the program code is operable to configure at least one processor in a first wireless entity to support positioning of a user equipment (UE) in a wireless network, includes program code to receive configurations for positioning reference signals (PRS) associated with one or more second wireless entities; program code to receive one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource; program code to receive an indication of relative transmission power between the PRS components of each aggregated PRS transmitted from the same second wireless entity; program code to process jointly the one or more PRS components for each aggregated PRS at least based on the received indication of relative transmission power; program code to perform positioning measurements using the processed aggregated PRS from the one or more second wireless entities; and program code to transmit location information based on the positioning measurements.

In one implementation, a method for supporting positioning of a user equipment (UE) in a wireless network performed by a first wireless entity, includes receiving configurations for positioning reference signals (PRS) associated with one or more second wireless entities; receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof; processing jointly the one or more PRS components for each aggregated PRS when the PRS components are configured with the same constraints and separately processing the one or more PRS components for each aggregated PRS when the PRS components are not configured with the same constraints; performing positioning measurements using the processed one or more aggregated PRS from the one or more second wireless entities; and transmitting location information based on the positioning measurements.

In one implementation, a first wireless entity configured to support positioning of a user equipment (UE) in a wireless network, includes an external interface comprising at least one wireless transceiver configured to wirelessly communicate with entities in the wireless network; at least one memory; and at least one processor coupled to the external interface and the at least one memory and configured to: receive, via the external interface, configurations for positioning reference signals (PRS) associated with one or more second wireless entities; receive, via the external interface, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof; process jointly the one or more PRS components for each aggregated PRS when the PRS components are configured with the same constraints and separately processing the one or more PRS components for each aggregated PRS when the PRS components are not configured with the same constraints; perform positioning measurements using the processed one or more aggregated PRS from the one or more second wireless entities; and transmit, via the external interface, location information based on the positioning measurements.

In one implementation, a first wireless entity configured to support positioning of a user equipment (UE) in a wireless network, includes means for receiving configurations for positioning reference signals (PRS) associated with one or more second wireless entities; means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof; means for processing jointly the one or more PRS components for each aggregated PRS when the PRS components are configured with the same constraints and separately processing the one or more PRS components for each aggregated PRS when the PRS components are not configured with the same constraints; means for performing positioning measurements using the processed one or more aggregated PRS from the one or more second wireless entities; and means for transmitting location information based on the positioning measurements.

In one implementation, a non-transitory storage medium including program code stored thereon, the program code is operable to configure at least one processor in a first wireless entity to support positioning of a user equipment (UE) in a wireless network, includes program code to receive configurations for positioning reference signals (PRS) associated with one or more second wireless entities; program code to receive one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof; program code to process jointly the one or more PRS components for each aggregated PRS when the PRS components are configured with the same constraints and separately processing the one or more PRS components for each aggregated PRS when the PRS components are not configured with the same constraints; program code to perform positioning measurements using the processed one or more aggregated PRS from the one or more second wireless entities; and program code to transmit location information based on the positioning measurements.

In one implementation, a method for supporting positioning of a user equipment (UE) in a wireless network performed by the UE, includes providing a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource; receiving configurations for downlink (DL) positioning reference signals (PRS) associated with one or more TRPs in the wireless network; receiving aggregated DL PRS from a plurality of TRPs in the wireless network; and performing positioning measurements using the aggregated DL PRS from the plurality of TRPs; and transmitting location information based on the positioning measurements to a location server.

In one implementation, a user equipment (UE) configured to support positioning of the UE in a wireless network, includes at least one wireless transceiver configured to wirelessly communicate with entities in the wireless network; at least one memory; and at least one processor coupled to the at least one wireless transceiver and the at least one memory and configured to: provide, via the at least one wireless transceiver, a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource; receive, via the at least one wireless transceiver, configurations for downlink (DL) positioning reference signals (PRS) associated with one or more TRPs in the wireless network; receive aggregated DL PRS from a plurality of TRPs in the wireless network; perform positioning measurements using the aggregated DL PRS from the plurality of TRPs; and transmit, via the at least one wireless transceiver, location information based on the positioning measurements to a location server.

In one implementation, a user equipment (UE) in a wireless network configured to support positioning of the UE, includes means for providing a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource; means for receiving configurations for downlink (DL) positioning reference signals (PRS) associated with one or more TRPs in the wireless network; means for receiving aggregated DL PRS from a plurality of TRPs in the wireless network; and means for performing positioning measurements using the aggregated DL PRS from the plurality of TRPs; and means for transmitting location information based on the positioning measurements to a location server.

In one implementation, a non-transitory storage medium including program code stored thereon, the program code is operable to configure at least one processor in a user equipment (UE) in a wireless network to support positioning of the UE, includes program code to provide a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource; program code to receive configurations for downlink (DL) positioning reference signals (PRS) associated with one or more TRPs in the wireless network; program code to receive aggregated DL PRS from a plurality of TRPs in the wireless network; program code to perform positioning measurements using the aggregated DL PRS from the plurality of TRPs; and program code to transmit location information based on the positioning measurements to a location server.

Figure 1:
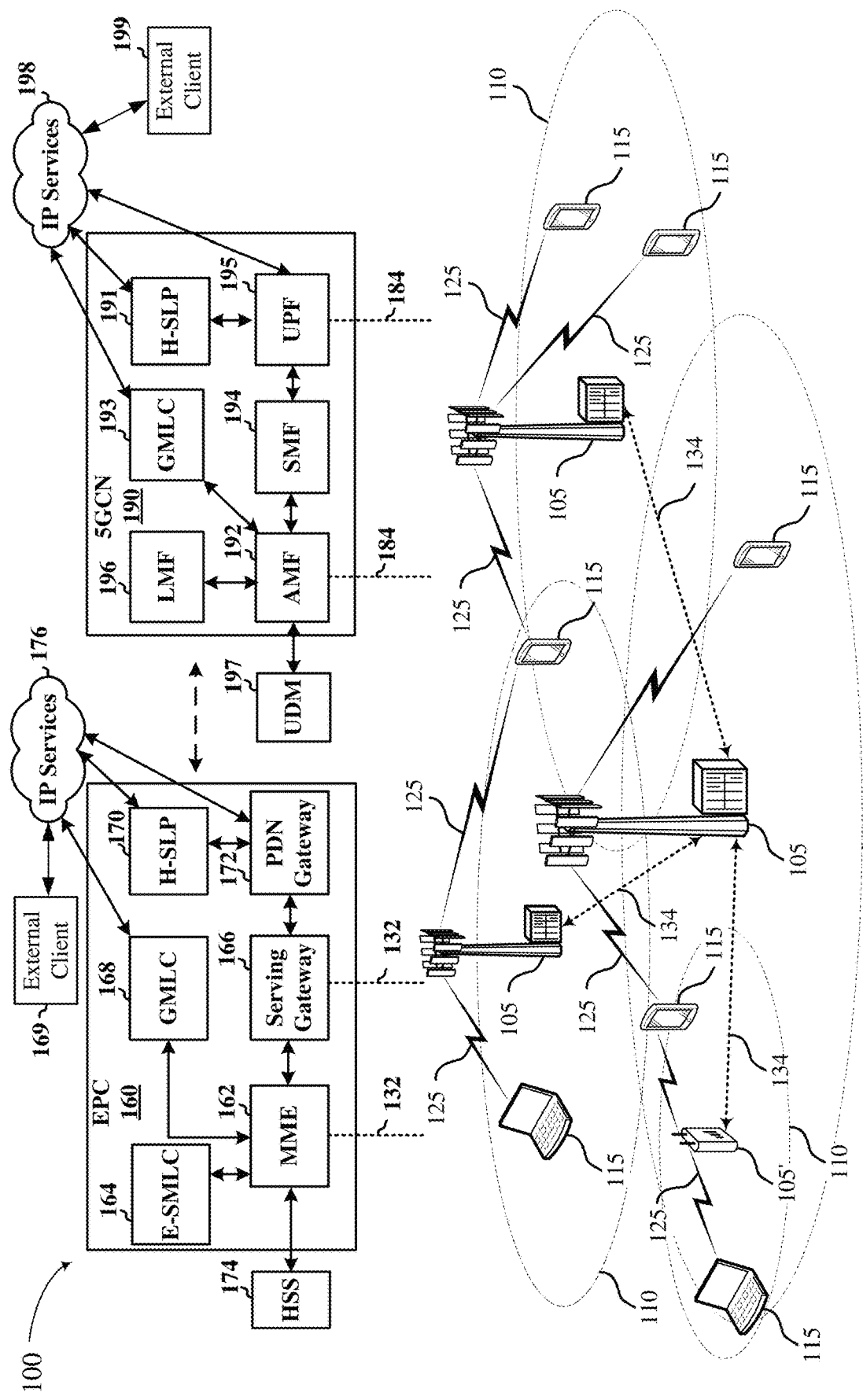
FIG. 1 shows an architecture of an exemplary system capable of supporting aggregated downlink (DL) Positioning Reference Signals (PRS) in accordance with aspects of the present disclosure.

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Aspects of the present disclosure provide apparatus, methods, processing systems, and computer readable mediums for wireless communication services that use reference signals, such as positioning reference signals (PRS) or sounding reference signals (SRS) for positioning. For example, transmission/reception points (TRP) may transmit downlink (DL) PRS for position determination of a UE. The UE may transmit uplink (UL) PRS to TRPs or sidelink (SL) PRS, sometimes referred to as UL or SL sounding reference signals (SRS) for positioning. While aspects of the present disclosure are sometimes described herein with reference to DL PRS, it should be understood that, unless stated otherwise, the present disclosure may be applied to UL and SL PRS. The PRS are commonly transmitted using multiple Component Carriers, bands, frequency layers, or bandwidths in a same band, but each PRS is bandwidth limited. By aggregating the PRS for positioning, e.g., a UE or TRP may jointly process a plurality of PRS resources thereby increasing the effective bandwidth of the PRS to improve positioning accuracy.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as Long Term Evolution (LTE), code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G, 4G, and 5G (including NR technologies) wireless technologies, aspects of the present disclosure may be applied in other generation-based communication systems, including future G technologies.

The terms "mobile device", "mobile stations" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile device" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile device."

As described herein, positioning reference signals (PRS) may be aggregated, e.g., combined at the receiver to span at least one of contiguous Component Carriers (CCs), bands, frequency layers, or bandwidths within a same band, or bandwidths of different bands, or a combination thereof. The use of aggregated DL PRS effectively increases the PRS bandwidth, which improves position measurements, e.g., by increasing the accuracy of time of arrival measurements. The PRS may be aggregated, for example, when transmitted from the same antenna port from a TRP and the PRS have aligned constraints.

FIG. 1 illustrates an example of a wireless communications system 100 that supports aggregated PRS in accordance with one or more aspects of the present disclosure. The wireless communications system 100 includes base stations 105, UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some examples, the wireless communications system 100 may be a Long Term Evolution (LTE) network, an LTE-Advanced (LTE-A) network, an LTE-A Pro network, or a New Radio (NR) network.

Base stations 105 may wirelessly communicate with UEs 115 via one or more base station antennas. A base station 105 as described herein may include or may be referred to by those skilled in the art as a base transceiver station, a radio base station, an access point, a radio transceiver, a NodeB, an eNodeB (eNB), a next-generation NodeB or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 115.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink (UL) transmissions from a UE 115 to a base station 105, downlink (DL) transmissions from a base station 105 to a UE 115, or sidelink transmissions from one UE 115 to another UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a base station 105 may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a personal electronic device such as a cellular phone, a smart phone, a session initiation protocol (SIP) phone, a personal digital assistant (PDA), a satellite radio, a global positioning system, a multimedia device, a video device, a digital audio player (such as an MP3 player), a camera, a game console, a wearable device, a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, a healthcare device, an implant, a sensor/actuator, a display, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or to enable automated behavior by machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the EPC 160 and/or 5GC 190 and with one another. For example, base stations 105 (e.g., which may be an example of an evolved NodeB (eNB), a next generation NodeB (gNB), or an access node controller (ANC)) may interface with their respective core networks through backhaul links (e.g., via an S1, N2, N3, or other interface). For example, eNB base stations 105 may interface with EPC 160 via backhaul links 132, while gNB base stations 105 may interface with 5GC 190 via backhaul links 184. Base stations 105 may communicate with one another over backhaul links 134 (e.g., via an X2, Xn, or other interface), which may be wired or wireless communication links, either directly (e.g., directly between base stations 105) or indirectly (e.g., via core network or intermediate base stations). The backhaul links 134 may be wired or may be wireless, as illustrated by backhaul link 134 to movable base station 105'.

The core networks 160/190 may provide user authentication, access authorization, tracking, Internet Protocol (IP) connectivity, and other access, routing, or mobility functions. The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC) or Location Server Surrogate (LSS). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be regarded as supporting different spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 160/190 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols and, in some instances, a symbol of a mini-slot or the mini-slot itself may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations 105 or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs 115 that can support simultaneous communications via carriers associated with more than one different bandwidth.

As described herein, wireless communications system 100 may support NR and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105 or as part of a mobility or beam management procedure for directional transmission associated with the enhanced channel resources.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems and emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Aspects of wireless communications system 100 may include use of PRS transmissions by the base station 105 or sounding reference signal (SRS) transmissions by the UE 115 for UE location determination. For downlink-based UE location determination, a location server, e.g., an E-SMLC 164 in an LTE network or an LMF 196 in a NR network (sometimes referred to as location server 164/196), may be used to provide positioning assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques.

A position estimation of the UE 115 may be determined using reference signals, such as PRS signals, from one or more base stations 105. Positioning methods, such as Observed Time Difference of Arrival (OTDOA), DL Time Difference of Arrival (DL-TDOA), DL Reference Signal Received Power (DL RSRP), time difference between reception and transmission of signals (Rx-Tx), DL Angle of Departure (DL AoD), Enhanced Cell ID (ECID) are position methods that may be used to estimate the position of the UE 115 using reference signals from base stations. OTDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g. as defined in 3GPP TS 36.211.

Other positioning methods may use reference signals transmitted by or received by base stations. While the present disclosure may be detailed with reference to a single positioning method for brevity, it should be understood that present disclosure is applicable to multiple positioning methods, including downlink-based positioning methods, uplink based positioning methods and downlink and uplink based positioning methods. For example, other positioning methods include, e.g., downlink based positioning methods such as DL Time Difference of Arrival (DL-TDOA), UL Reference Signal Received Power (UL RSRP), time difference between reception and transmission of signals (Rx-Tx), DL Angle of Departure (DL AoD), Enhanced Cell ID (ECID); uplink based positioning methods, e.g., UL Time Difference of Arrival (UL-TDOA), UL Angle of Arrival (UL AoA), UL Relative Time of Arrival (UL-RTOA); and downlink and uplink based positioning methods, e.g., Round-trip time (RTT) with one or more neighboring base stations.

Figure 2:
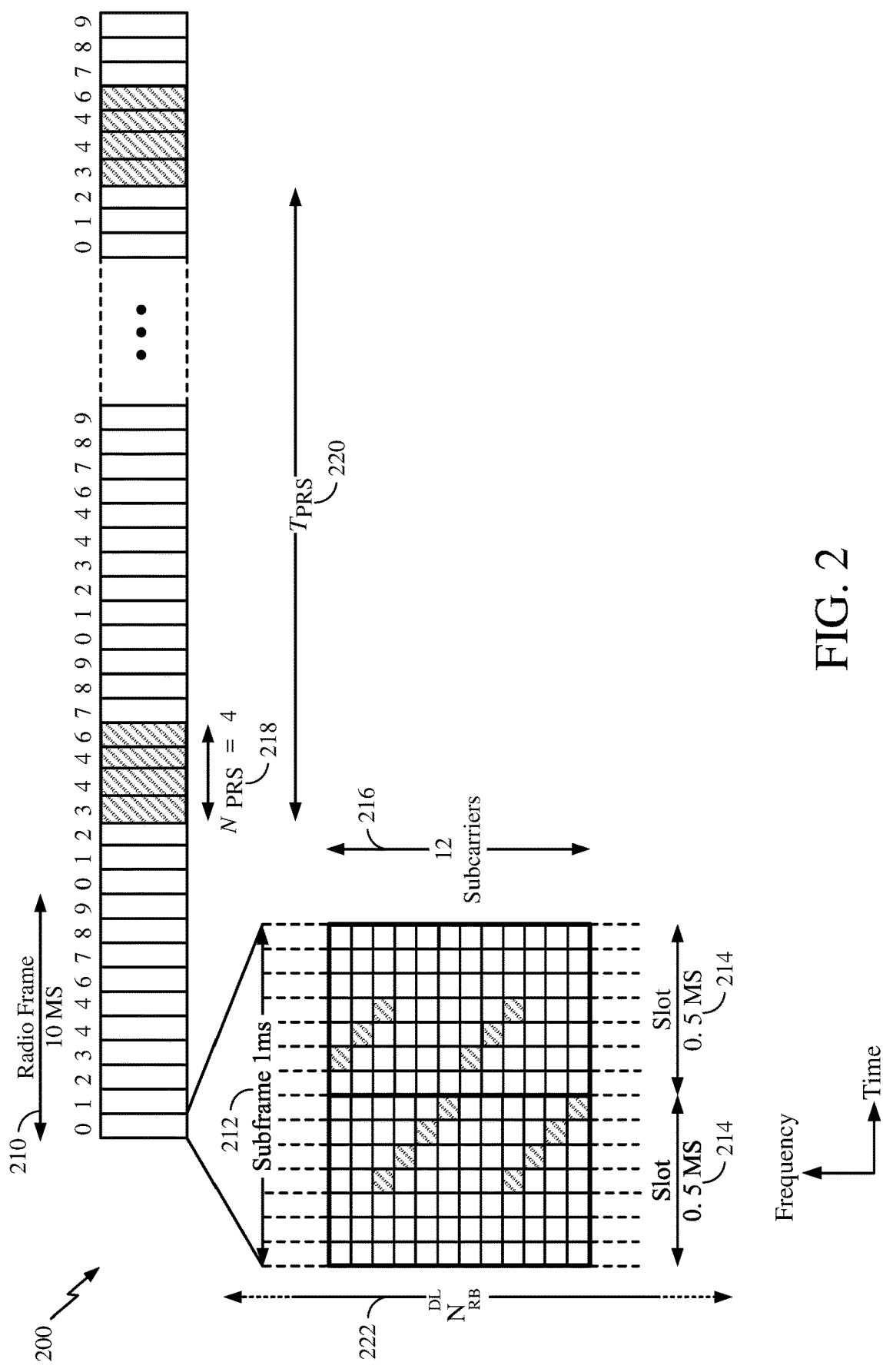
FIG. 2 shows the structure of an exemplary subframe with PRS.

FIG. 2 shows a structure of an exemplary conventional subframe sequence 200 with PRS positioning occasions. Subframe sequence 200 may be applicable to the broadcast of PRS signals from a base station (e.g., any of the base stations described herein) or other network node. The subframe sequence 200 may be used in LTE systems, and the same or similar subframe sequence may be used in other communication technologies/protocols, such as 5G and NR. In FIG. 2, time is represented horizontally (e.g., on the X axis) with time increasing from left to right, while frequency is represented vertically (e.g., on the Y axis) with frequency increasing (or decreasing) from bottom to top. As shown in FIG. 2, downlink and uplink radio frames 210 may be of 10 millisecond (ms) duration each. For downlink frequency division duplex (FDD) mode, radio frames 210 are organized, in the illustrated example, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216 (also referred to as "tones" or "bins"). For example, for a normal length cyclic prefix (CP) using, for example, 15 kHz spacing, subcarriers 216 may be grouped into a group of twelve (12) subcarriers. A resource of one OFDM symbol length in the time domain and one subcarrier in the frequency domain (represented as a block of subframe 212) is referred to as a resource element (RE). Each grouping of the 12 subcarriers 216 and the 14 OFDM symbols is termed a resource block (RB) and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$. Note that the frequency component of a resource block (e.g., the 12 subcarriers) is referred to as a physical resource block (PRB).

A base station may transmit radio frames (e.g., radio frames 210), or other physical layer signaling sequences, supporting PRS signals (i.e. a downlink (DL) PRS) according to frame configurations either similar to, or the same as that, shown in FIG. 2, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 2.

A collection of resource elements that are used for transmission of PRS signals is referred to as a "PRS resource." The collection of resource elements can span multiple PRBs in the frequency domain and N (e.g., 1 or more) consecutive symbol(s) within a slot 214 in the time domain. For example, the cross-hatched resource elements in the slots 214 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 2 illustrates a periodicity of positioning occasions where $N_{PRS}$ equals 4 218 and $T_{PRS}$ is greater than or equal to 20 220. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a jth positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE, via a network entity, such as a location server (e.g., LMF) or a base station (e.g., gNB), to enable the UE to perform PRS positioning measurements. The PRS configurations may be provided, for example, per TRP. In some implementations, the UE may receive PRS configuration information from both the location server and the base station. For example, the PRS configurations may be provided to the UE from a location server per base station (e.g., gNB), and the base station may determine the PRS offset of each TRP and may provide this configuration to the UE. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to PRS discussed above, UL PRS transmitted by UEs, sometimes referred to as sounding reference signals (SRS) in NR are UE-specifically configured reference signals used for the purposes of the sounding the uplink radio channel Like for channel state information reference signals (CSI-RS), such sounding provides various levels of knowledge of the radio channel characteristics. For example, the SRS can be used at the gNB simply to obtain signal strength measurements, e.g., for the purposes of UL beam management. In another example, SRS can be used at the gNB to obtain detailed amplitude and phase estimates as a function of frequency, time, and space. In NR, channel sounding with SRS supports a more diverse set of use cases compared to LTE. For example, SRS supports downlink CSI acquisition for reciprocity-based gNB transmit beamforming (downlink MIMO), uplink CSI acquisition for link adaptation and codebook/non-codebook based precoding for uplink MIMO, and uplink beam management.

The time/frequency mapping of an SRS resource may be defined by the following characteristics. Time duration NsymbSRS is the time duration of an SRS resource, which can be 1, 2, or 4 consecutive OFDM symbols within a slot, in contrast to LTE which allows only a single OFDM symbol per slot. Starting symbol location l0 is the starting symbol of an SRS resource, which can be located anywhere within the last 6 OFDM symbols of a slot provided the resource does not cross the end-of-slot boundary. Repetition factor R is for an SRS resource configured with frequency hopping, repetition allows the same set of subcarriers to be sounded in R consecutive OFDM symbols before the next hop occurs. The allowed values of R are 1, 2, 4 where R≤NsymbSRS. Transmission comb spacing $K_{TC}$ and comb offset kTC define a frequency domain comb structure occupied by resource elements (REs) of an SRS resource, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , KTC−1 REs. Thus, for comb spacing KTC=2, there are 2 different combs available for multiplexing if needed, and for comb spacing KTC=4, there are 4 different available combs. For the case of periodic and semi-persistent SRS, a periodicity is semi-statically configured such that the resource is transmitted once every N slots where the allowed configurable values are N∈{1, 2, 4, 5, 8, 10, 16, 20, 32, 40, 64, 80, 160, 320, 640, 1280, 2560}. In addition, an offset O is configured where O∈{0, 1, . . . , N−1} measured in number of slots. The reference point for the slot offset is with respect to the first slot (slot 0) of radio frame 0. The bandwidth (BW) configuration of an SRS resource is controlled by the RRC parameters; C_"SRS", n_"shift", B_"SRS", b_"hop", and n_"RRC". Together these parameters define which portion of a bandwidth part (BWP) is sounded by an SRS resource. The parameter C_"SRS"∈{0, 1, . . . , 63} selects a bandwidth configuration for the SRS resource corresponding to a particular row of a length-64 Table. For positioning, the number of consecutive OFDM symbols in an SRS resource is configurable with one of the values in the set {1, 2, 4, 8, 12}. For positioning, starting positions in the time domain for the SRS resource can be anywhere in the slot, i.e. an offset $l_{offset}$ range of {0, 1, . . . , 13}. For positioning, with regard to UL Beam management/alignment towards serving and neighboring cells, UE transmit (Tx) beam-sweeping on UL SRS transmissions across multiple UL SRS Resources may be used.

As with UEs, base stations are not expected to blindly perform detection of UL PRS signals. The expected UL PRS configuration, as described above, may be provided to the UE, e.g., in assistance data. The UE may then transmit UL PRS signals consistent with the UL PRS configuration that the base stations are expecting. The base stations receive the UL PRS signals from the UE and generate positioning measurements based on the received signals and the expected UL PRS configuration. The positioning measurements are reported to the location server or the UE for position estimation.

A UE, however, may be unable to transmit UL PRS signals in accordance with the expected UL PRS configuration. If the UE fails to transmit the UL PRS signals with the expected PRS configuration, positioning measurements performed by the base stations will be inaccurate as they will be based on the expected UL PRS configuration. In accordance with an implementation, the UE may send a reference signal transmission report to a network entity, such as a location server, another base station, or a transmission reception point (TRP), indicating that the UL PRS signals were not transmitted according to expected UL PRS configuration.

A UE may fail to transmit the UL PRS signals in accordance with the expected UL PRS configuration in various manners. For example, the UE may not be able to transmit the UL PRS signals at all, may transmit the UL PRS signals with lower power than configured, may transmit the UL PRS signals on a different beam than configured, or a combination thereof. Thus, the reference signal transmission report provided by the UE may identify the manner in which the UL PRS signals were not in accordance with the expected UL PRS configuration, e.g., the UE may not be able to transmit the UL PRS signals at all, may transmit the UL PRS signals with lower power than configured, may transmit the UL PRS signals with a different spatial relation, i.e., on a different beam, than configured, or a combination thereof.

Moreover, there may be a variety of reasons that the UE cannot transmit the UL PRS signals in accordance with the expected UL PRS configurations. The reasons that the UL PRS signals are not transmitted in accordance with the expected UL PRS configurations may be dynamic, i.e., the location server cannot know beforehand that the UL PRS signals will not be transmitted in accordance with the expected UL PRS configurations. In accordance with an implementation, the reference signal transmission report from the UE may additionally provide reasons why the UL PRS signals were not transmitted according to expected UL PRS configuration.

For example, the UE may be unable to transmit the UL PRS signals because the UE is in the process of a serving Cell change, i.e., handover. For example, the UE may be in reconfiguration mode due to the Cell change and is unable to transmit the UL PRS signals. The UE may be unable to transmit the UL PRS signal due to collision with a DL symbol. The UE may be unable to transmit the UL PRS signal due to collision with another UL PHY channel, e.g., the colliding UL PHY channel may have a higher priority for transmission. The UE may be unable to transmit the UL PRS signal due to being outside the active bandwidth part of the UE. For example, the wideband spectrum in the NR network may be divided into multiple, e.g., four, non-overlapping sub-bands, where one sub-band may be assigned to the BWP of the UE, and the UL PRS signal is configured to be in a different sub-band. The UE may be unable to transmit the UL PRS signal due to interruption caused by uplink or downlink RF retuning time. For example, during carrier switching or during an UL and/or DL retuning phase, rf-RetuningTimeUL and/or rf-RetuningTimeDL, the UE is unable to transmit UL PRS signals. The UE may be unable to transmit the UL PRS signal due to the UE being in an idle mode, such as discontinuous reception (DRX) mode. For example, DRX is a mechanism in which the UE goes into a "sleep" mode for a certain period of time and "wakes up" for another period of time. If the UL PRS signal is configured to be transmitted during a "sleep" period, the UE cannot transmit the UL PRS signal.

The UE may transmit the UL PRS signals, but the transmission may not be in accordance with the expected UL PRS configuration. For example, the UE may transmit the UL PRS signals but with lower power than is expected, i.e., not in accordance with the UL PRS configuration. For example, the UE may transmit the UL PRS signals with lower power than expected due to carrier aggregation uplink power limitations. For example, if the UE is transmitting on a primary component carrier and a secondary component carrier, the total uplink power of a UE is limited and the DL PRS transmission may be transmitted with reduced power. The UE may transmit the UL PRS signals with lower power than expected due to Dual Connectivity (DC). For example, similar to carrier aggregation uplink power limitations, the total uplink power of a UE may be limited when the UE transmits and receives signals on multiple component carriers and the DL PRS transmission may be transmitted with reduced power. The UE may transmit the UL PRS signals with lower power than expected due to Maximum Permissible Exposure (MPE), e.g., safety limitations due to the use of FR2. Additionally, the UE may transmit the UL PRS signals with lower power or not transmit the UL PRS signal due to being in a low battery state.

The may transmit the UL PRS signals on a beam that is different than expected. For example, in FR2, the UE may transmit the UL PRS signals but not use the spatial-Tx-Reference that is configured due to collision with a Tx beam of a higher priority channel.

In accordance with an implementation, the reference signal transmission report by the UE may provide additional information with respect to the UL PRS signals that were not transmitted according to expected UL PRS configuration. For example, the UE may indicate the slot ID or subframe ID or frame ID that contains the UL PRS signals for positioning that were affected. The UE may indicate the resource ID, or resource set ID of the UL PRS signal that were affected. If a UE was not able to transmit the UL PRS signal according to the expected spatial relation configuration, e.g., on a specific Tx-beam, the UE may indicate that the Reference ID of a DL signal (e.g. SSB or DL PRS or CSIRS) that is configured for the spatial relation between a reference signal from the transmission-reception point and the UL PRS signal. For example, if the UL PRS is transmitted with a different beam than the one configured, the UE may report which beam was used. The UE may indicate the Reference ID of a DL signal that is configured for path loss determination between a reference signal from the transmission-reception point and the UL PRS signal. The UE may indicate the symbols, or a group of symbols of the UL PRS signals that were affected. If there was collision with another UL channel, the UE may indicate the type of channel of the affected UL PRS, or whether the UL channel is periodic, semi-persistent, or aperiodic. The UE may provide information relative to the idle mode, e.g., the DRX configuration.

Figure 3:
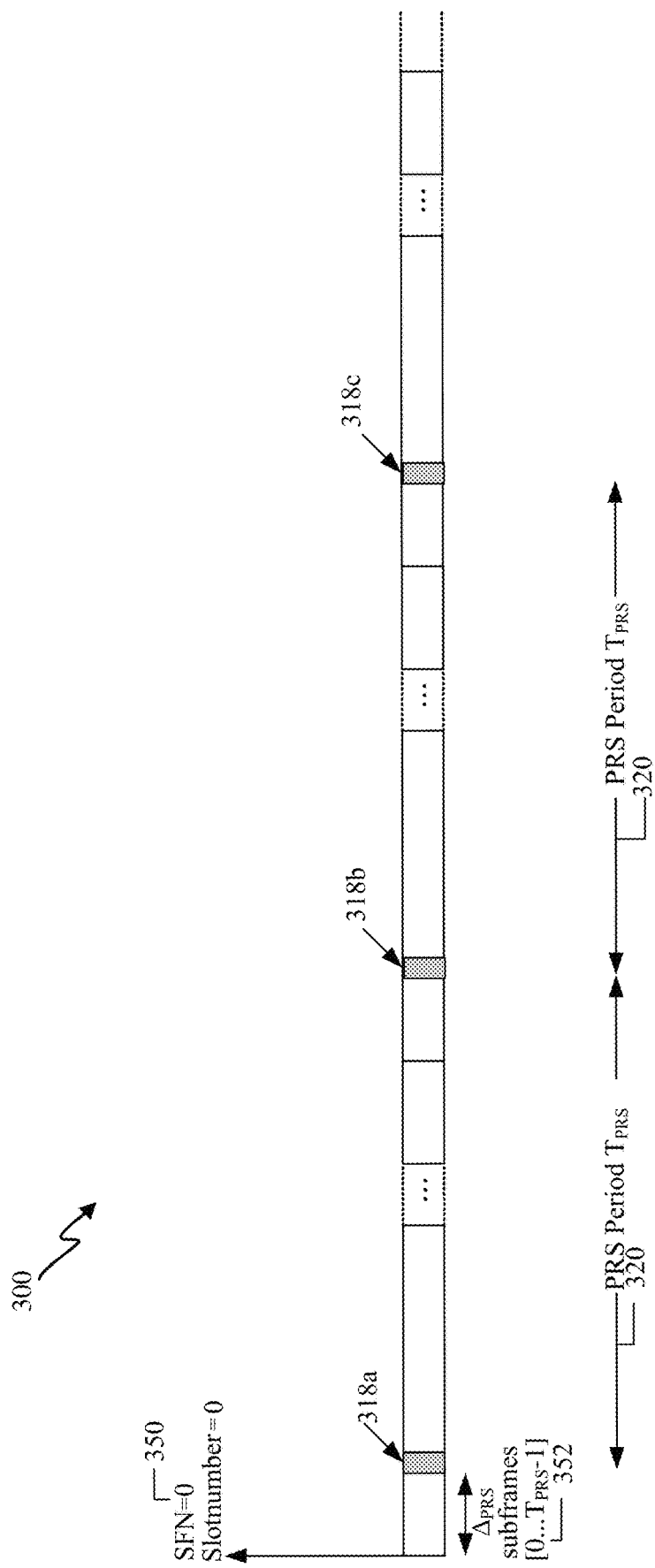
FIG. 3 illustrates an exemplary PRS configuration for a cell supported by a wireless node (TRP).

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity ($T_{PRS}$) 320. Typically, the cell specific PRS subframe configuration is defined by a "PRS Configuration Index" $I_{PRS}$ included in the OTDOA assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0, \quad \text{eq. 1}$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 320, and $\Delta_{PRS}$ is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity $T_{PRS}$ 320 and PRS subframe offset $\Delta_{PRS}$ using Table 1. The UE 115 may then determine the radio frame, subframe and slot when a PRS is scheduled in the cell (e.g., using equation (1)).

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity TRH, that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

A New Radio (NR) DL PRS resource may be defined as a set of resource elements used for NR DL PRS transmission that can span multiple PRBs within N (1 or more) consecutive symbol(s) within a slot. In any OFDM symbol, a PRS resource occupies consecutive PRBs.

A DL PRS Resource Set may be defined as a set of DL PRS Resources, where each DL PRS Resource has a DL PRS Resource ID. The DL PRS Resources in a DL PRS Resource set are associated with the same TRP. A DL PRS Resource ID in a DL PRS Resource set may be associated with a single beam transmitted from a single TRP, e.g., where the TRP may transmit one or more beams. It may be noted that this does not have any implications on whether the TRPs and beams from which signals are transmitted are known to a UE.

A DL PRS occasion may be one instance of periodically repeated time windows (consecutive slot(s)) where DL PRS is expected to be transmitted. A DL PRS configuration, e.g., including DL PRS transmission schedule, may be indicated to a UE for DL PRS positioning measurements. For example, the UE may not be expected to perform any blind detection of DL PRS configurations.

Figure 4:
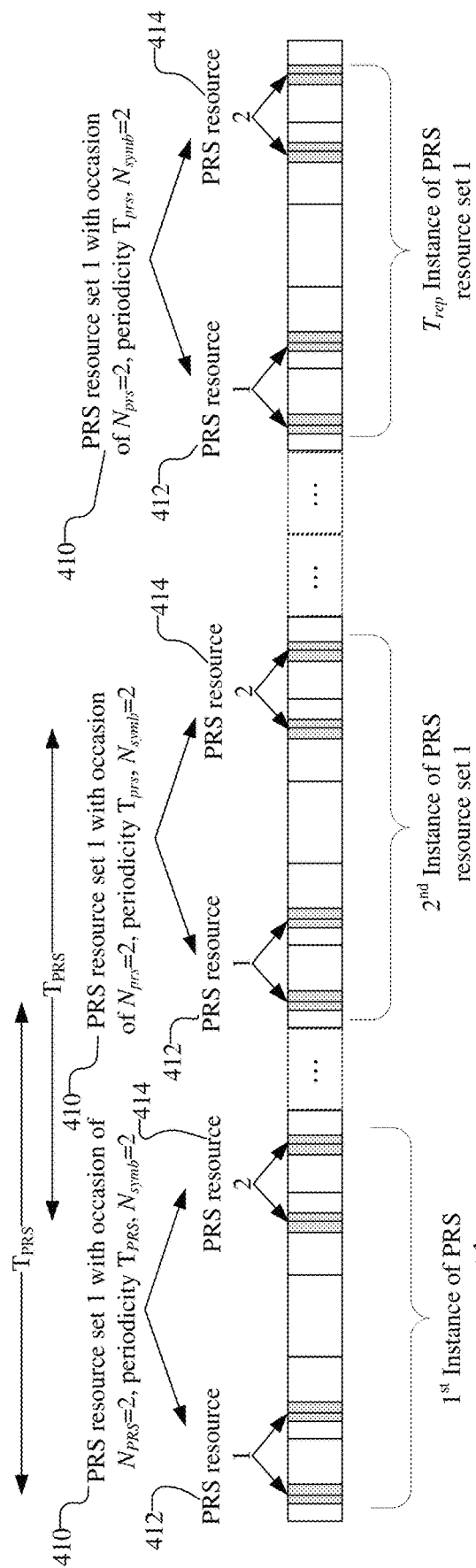
FIG. 4 illustrates an exemplary PRS configuration in a multi-beam system.

FIG. 4 illustrates an exemplary PRS configuration 400 in a multi-beam system. A base station 105, for example, may configure multiple PRS resource sets, each one associated with one periodicity, and transmitted across multiple occasions. As illustrated, a PRS resource set 1 410 may be defined as a set of PRS resources, including PRS resource 1 412 and PRS resource 2 414, which are sets of resource elements spanning multiple PRBs within N (1 or more) consecutive symbol(s) within a slot. Each of PRS resource 1 412 and PRS resource 2 414 has a DL PRS Resource ID and are both are associated with the same TRP, but may be transmitted on different beams. FIG. 4 illustrates a first instance 410a of PRS resource set 1 410, a second instance 410b of PRS resource set 1 410, and a $T_{rep}$ instance 410a of PRS resource set 1 410. The PRS resource set 1 410 is defined with an occasion of $N_{PRS}$=2, a periodicity $T_{PRS}$, and $N_{symb}$=2. FIG. 4 illustrates an example where one configured $T_{rep}$-bit muting pattern controls which occasion of the PRS resource is muted.

By agreement made in RAN1 under 3GPP, a "frequency layer" renamed to a "positioning frequency layer" for positioning, is a collection of DL PRS Resource Sets across one or more TRPs which have the same subcarrier spacing (SCS) and cyclic prefix (CP) type, the same center frequency, and the same point-A. All DL PRS Resource Sets belonging to the same positioning frequency layer have the same value of DL PRS Bandwidth and Start PRB. Further, all DL PRS Resource Sets belonging to the same positioning frequency layer have the same value of comb size.

Conventionally, if the DL reference signal to be used as a DL path loss reference is a DL-PRS, the dl-PRS-Resource-Power is provided. The dl-PRS-Resource-Power is defined as average Energy Per Resource Element (EPRE) of the resource elements that carry DL-PRS Resource signals in dBm that the TRP uses for DL-PRS Resource transmission.

In terms of DL PRS transmission (TX) power, conventionally, the UE assumes a constant EPRE for all resource elements (REs) of a given DL PRS Resource and that the DL PRS Resource TX power value range is the same as for synchronization signal block (SSB). Further, by agreement in RAN1, a UE includes a capability defined as the duration of DL PRS symbols in units of ms that the UE can process every T ms assuming 272 PRB allocation.

As discussed above, PRS may be muted. A bitmap for DL PRS muting may be configured for a DL PRS Resource Set. The bitmap size values, for example, may be 2, 4, 8, 16, 32 bits. Multiple options for the applicability of the bitmap are supported. In a first option, each bit in the bitmap corresponds to a configurable number of consecutive instances (in a periodic transmission of DL-PRS resource sets) of a DL-PRS Resource set. All DL-PRS Resources within a DL-PRS Resource Set instance are muted for a DL-PRS Resource Set instance that is indicated to be muted by the bitmap. In a second option, each bit in the bitmap corresponds to a single repetition index for each of the DL-PRS Resources within an instance of a DL-PRS Resource Set, e.g., the length of the bitmap is equal to DL-PRS-ResourceRepetitionFactor. The second option may apply to all instances of the DL-PRS Resource Set that the above DL-PRS Resources are part of.

Figure 5A:
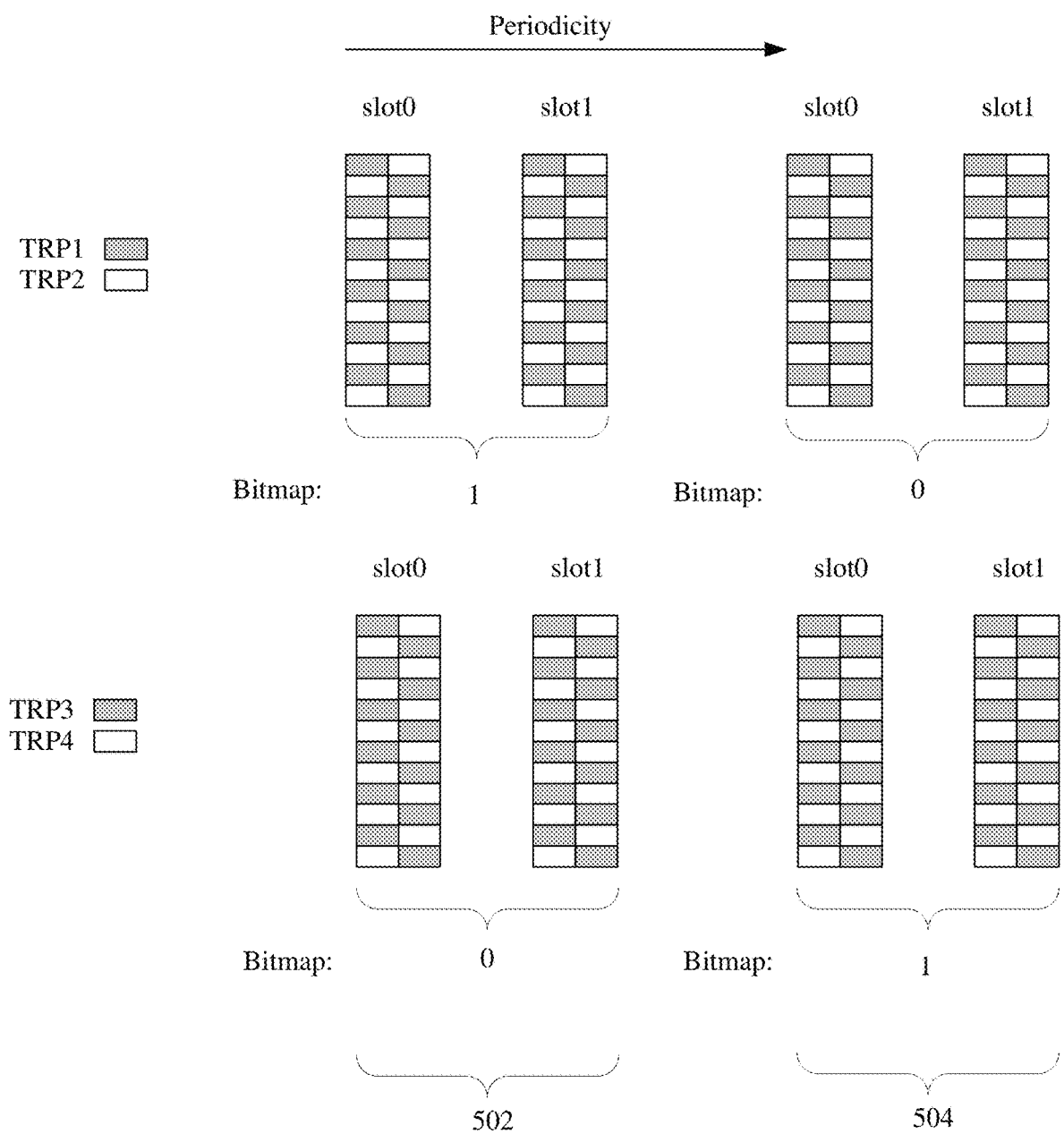
FIG. 5A is a diagram illustrating an implementation of muting PRS transmitted by four TRPs.

FIG. 5A illustrates the first option in a scenario in which there are four TRPs, TRP1, TRP2, TRP3, and TRP4, each transmitting a PRS of comb-2, 2-symbol with repetition of 2 in consecutive slots, slot0 and slot1, in a first occasion 502 and a second occasion 502. Pairs of TRPs, e.g., TRP1/TRP2 and TRP3/TRP4, are frequency division multiplexed (FDM) using comb-2. Each TRP is configured with a 2-bit bitmap (each bit corresponds to each of the two occasions). If the bit is 1, then the TRP transmits in that occasion, otherwise it is muted (all repetitions of that specific occasion are muted).

In the muting configuration illustrated in FIG. 5A, the UE needs to receive both occasions 502 and 504 to get a "clean copy" of PRS from all TRPs. For example, in the first occasion 502, only TRP1 and TRP2 transmit in both repetitions, while TRP3 and TRP4 are muted, and in the second occasion 504, only TRP3 and TRP4 transmit in both repetitions, while TRP1 and TRP2 are muted.

Figure 5B:
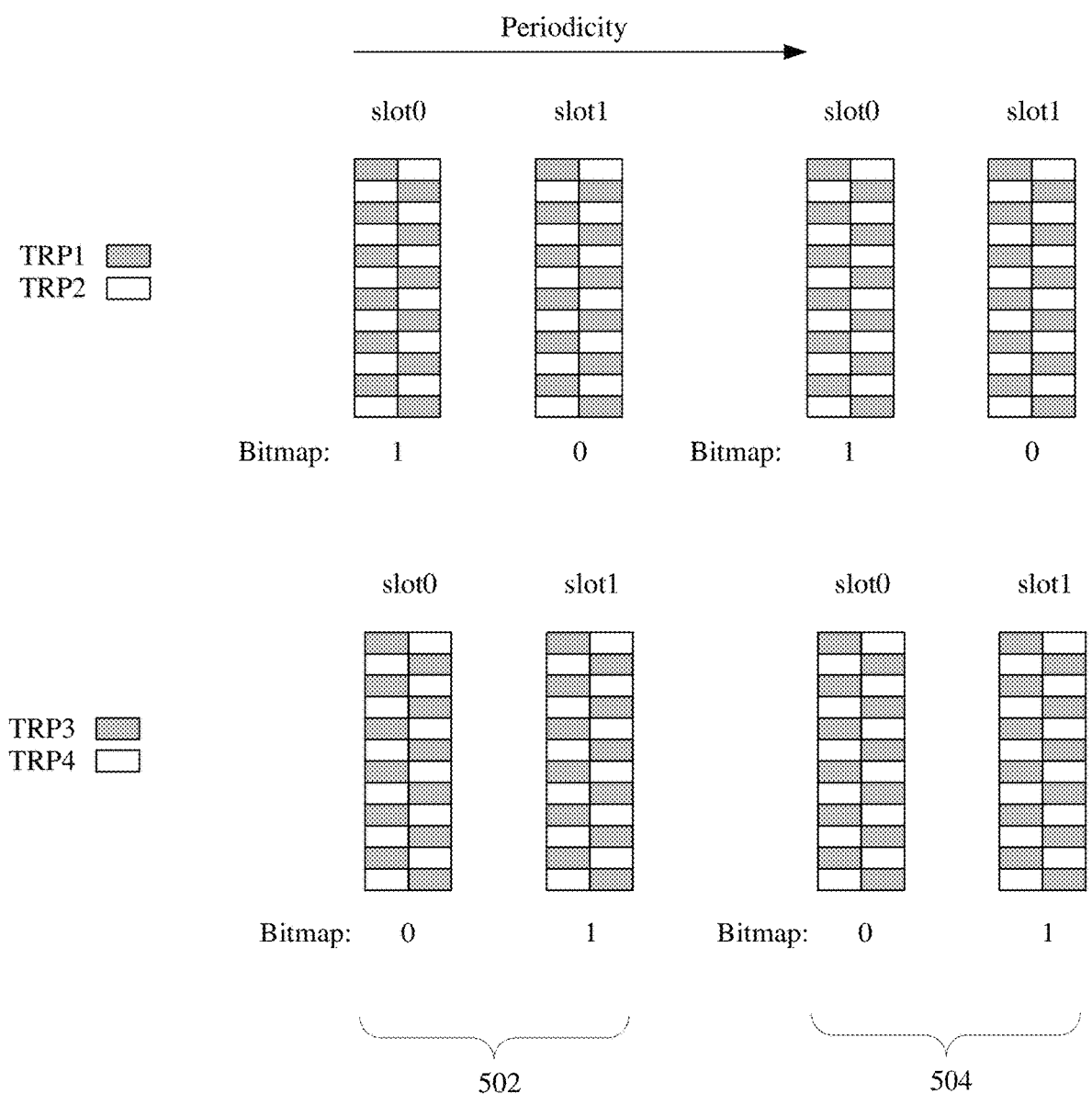
FIG. 5B is a diagram illustrating another implementation of muting PRS transmitted by four TRPs

FIG. 5B illustrates the second option in the same scenario as shown in FIG. 5A, where there are four TRPs, TRP1, TRP2, TRP3, and TRP4, each transmitting a PRS of comb-2, 2-symbol with repetition of 2 in consecutive slots, slot0 and slot1, in a first occasion 502 and a second occasion 502. Pairs of TRPs, e.g., TRP1/TRP2 and TRP3/TRP4, are frequency division multiplexed (FDM) using comb-2. Each TRP is configured with a 2-bit bitmap (each bit corresponds to each of the 2 repetitions). If the bit is 1, then the TRP transmits in that repetition index, otherwise it is muted.

In muting configuration shown in FIG. 5B, the UE receives clean copies of PRS from all four TRPs in one occasion. For example, in occasion 502, the first repetition (slot0) TRP1 and 2 transmit FDMed PRS with TRP3 and TRP4 muted, and in the second repetition (slot1), TRP3 and TRP4 transmit FDMed PRS, while TRP1 and TRP2 are muted.

Downlink PRS may be multiplexed with other PHY channels. When multiplexing DL PRS signals with other DL channel signals, for the serving TRP, the UE assumes that the DL PRS is not mapped to any symbol that contains Synchronization Symbols (SS) or Physical Broadcast Channel (PBCH). In a slot in which SS/PBCH is transmitted on some symbols, DL PRS can be transmitted on other symbols. For neighbor TRPs, when time-frequency location for SSB transmissions on the neighbor TRP is provided, the UE assumes that the DL-PRS is not mapped on symbols occupied by SSB transmissions of the neighbor TRP, i.e. DL PRS is not transmitted on these symbols. Configured DL PRS are transmitted on DL symbols of a slot configured by higher layers. Configured DL PRS are transmitted on symbols of a slot configured as flexible symbols by higher layers. If the UE is not provided with a measurement gap, the UE is not expected to process DL PRS Resources on serving or neighboring cells on symbols indicated as UL by the serving cell.

Figure 6:
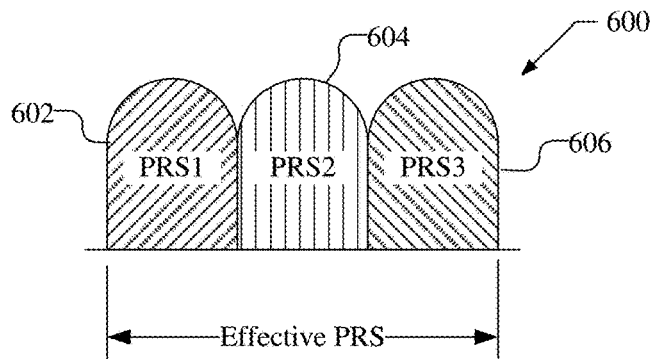
FIG. 6 illustrates aggregate DL PRS produced by individual PRS resources.

Conventionally, each PRS resources is separately processed by a UE during positioning measurements. Consequently, positioning measurements are limited by the bandwidth of each individual PRS. By stitching together PRS, however, the effective bandwidth of the PRS may be increased. FIG. 6, by way of example, illustrates a three individual PRS resources PRS1 602, PRS2 604, and PRS3 606 that are stitched together to produce an aggregated PRS 600 with an effective PRS bandwidth that is greater than the bandwidth of any of the PRS resources 602, 604, 606, individually. An increase in PRS bandwidth corresponds to an increase in accuracy of the TOA estimation performance, and thus, an OTDOA measurement. The aggregated PRS may be DL PRS transmitted by the same TRP or UL or SL PRS transmitted by the same UE.

Figure 7A:
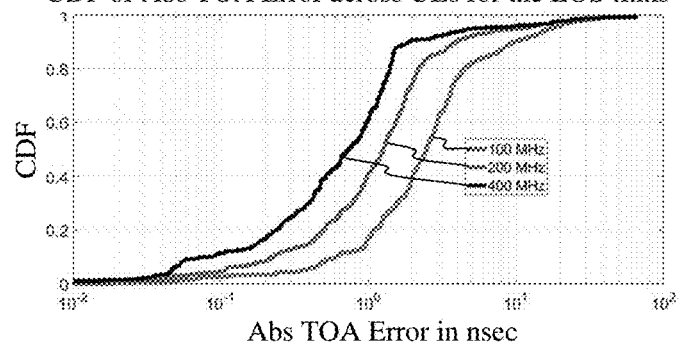
FIGS. 7A and 7B illustrate a correlation between in bandwidth in PRS and the TOA error for line of sight (LOS) and non-line of sight (nLOS) links.
Figure 7B:
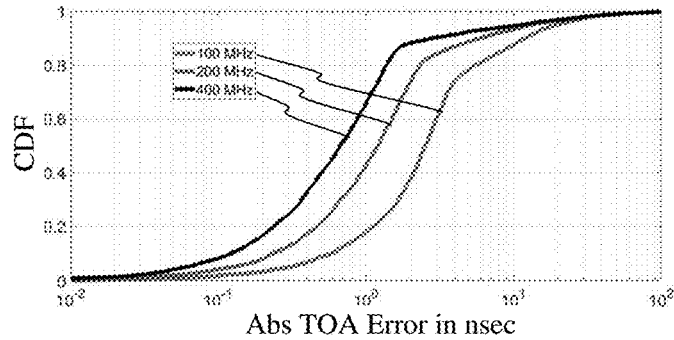

FIG. 7A illustrates a table and graph illustrating the correlation between an increase in bandwidth (BW) in PRS and the correlation distribution function (CDF) of absolute TOA error in nsec across UEs for line of sight (LOS) links. FIG. 7B similarly illustrates a table and graph illustrating the correlation between an increase in bandwidth (BW) in PRS and CDF of absolute TOA error in nsec across UEs for non-line of sight (nLOS) links. As can be seen, as the bandwidth of the PRS increases for a constant CDF, the absolute TOA error decreases.

An aggregated PRS as used herein may include one or more PRS components transmitted from a same TRP or same UE. Each PRS component transmitted from the same TRP or same UE may be a separate PRS resource each of which is associated with a contiguous frequency-domain bandwidth or may be a plurality of contiguous frequency-domain bandwidths spanned by a single PRS resource. By way of example, when each PRS component comprises a plurality of frequency domain bandwidths spanned by a single PRS resource, the aggregated PRS may have one PRS component.

For example, in one implementation, an aggregated PRS may be defined as a collection of PRS resources transmitted from the same transmitting entity, e.g., TRP or UE, such that the receiving, e.g., UE or TRP, may assume that the PRS are transmitted from the same antenna port. Each PRS resource of an aggregated PRS may be referred to herein as a PRS component. Thus, each PRS component transmitted from the same TRP may be a separate PRS resource each one associated with a contiguous frequency-domain bandwidth. Each PRS component may be physically transmitted on one or more of different component carriers, bands, frequency layers, or bandwidths in a same band.

As another example, in one implementation, an aggregated PRS may is defined as one PRS resource that is transmitted from one transmitting entity and that spans a plurality of non-contiguous bandwidths such that the receiving entity may assume that the PRS are transmitted from the same antenna port. Each individual contiguous frequency-domain bandwidth spanned by a single PRS resource of an aggregated PRS may be shall be referred to herein as a PRS component.

Across time, the receiving entity may not receive a consistent number of PRS components in the aggregated PRS. For example, PRS components may be punctured, e.g., the transmitting entity may not transmit a PRS component. For example, DL PRS components may collide with synchronization signal blocks (SSBs) or uplink symbols. Similarly, UL or SL PRS components may collide with SSBs or DL symbols. Additionally, the PRS components in an occasion of an aggregated PRS may not align in the time domain so the receiving entity cannot process one or more of the PRS components. For example, the PRS components may have a different slot structure due to slot format Downlink Control Information (DCI).

Figure 8A:
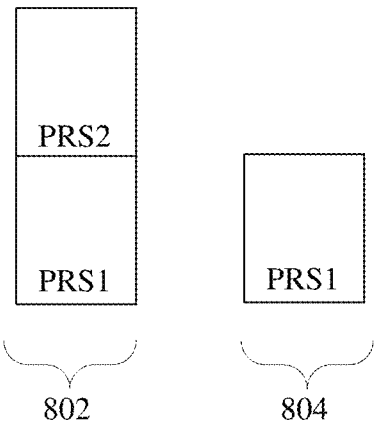
FIGS. 8A, 8B, and 8C illustrate examples in which a PRS component in an aggregated DL PRS may be punctured so that it is not received by the UE
Figure 8B:
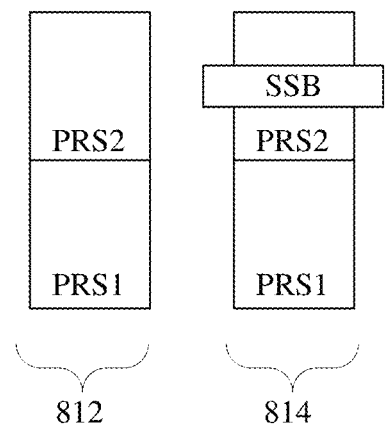
Figure 8C:
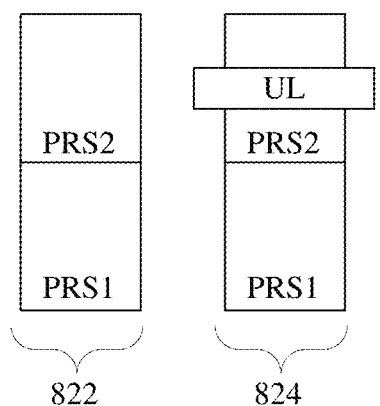

FIGS. 8A, 8B, and 8C illustrate examples in which a PRS component in an aggregated PRS cannot be processed by a receiving entity. FIG. 8A, by way of example, illustrates two occasions 802 and 804 including PRS1 and PRS2 of aggregated PRS received by a receiving entity, e.g., the UE for a DL or SL PRS or a TRP for an UL PRS. As illustrated, PRS components PRS1 and PRS2 are received in occasion 802, but PRS component PRS2 is not aligned in time domain with PRS component PRS1 in occasion 804, e.g., may have a different slot structure, and therefore is not processed by the receiving entity.

FIG. 8B illustrates another scenario in which PRS components PRS1 and PRS2 are aligned in time in occasions 812 and 814, but in the second occasion 814, a collision with SSB in the frequency layer of PRS component PRS2 prevents the receiving entity from receiving PRS resources.

FIG. 8C illustrates another scenario in which PRS components PRS1 and PRS2 are aligned in time in occasions 812 and 814, but in the second occasion 814, a collision with UL symbols in the frequency layer of PRS component PRS2 prevents the UE from receiving DL PRS resources. Similarly, a collision with DL symbols may prevent a TRP or UE from receiving UL or SL PRS resources.

Figure 9:
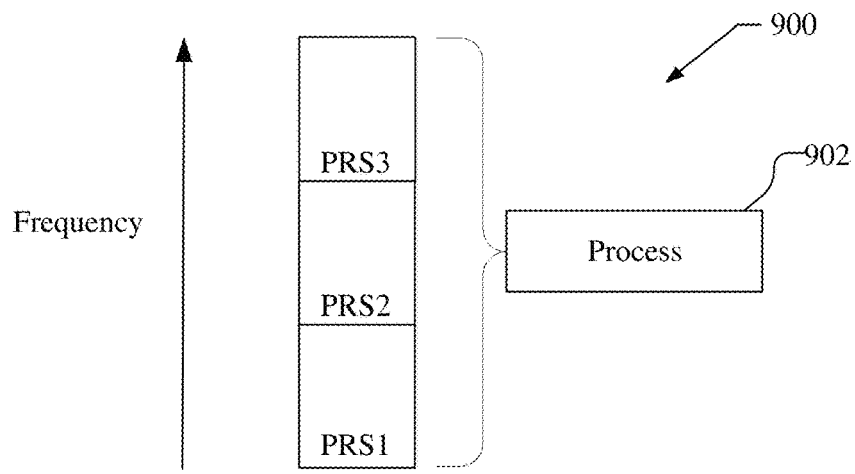
FIG. 9 illustrates an occasion that includes a plurality of PRS components of an aggregated DL PRS received by the UE that are jointly processed to increase the effective PRS bandwidth.

FIG. 9 illustrates an occasion 900 that includes a plurality of PRS components PRS1, PRS2, and PRS3 of an aggregated PRS received by a receiving entity, e.g., a UE or TRP. The PRS components PRS1, PRS2, and PRS3 are aligned in time and are not punctured. The unpunctured and aligned PRS components of the aggregated PRS received by the receiving entity may be jointly processed 902 by the receiving entity assuming that the PRS components of the aggregated PRS are transmitted from a same antenna port from the same transmitting entity, thereby increasing the effective PRS bandwidth. By jointly processing the PRS components, for example, the receiving entity processes the PRS components of the aggregated PRS under the assumption that the PRS components are transmitted from a same antenna port of the transmitting entity. By processing the PRS components jointly higher accuracy is expected by the measurement. Thus, for example, the unpunctured PRS components PRS1 and PRS2 in occasion 802 in FIG. 8A may be jointly processed by the receiving entity, effectively increasing the PRS bandwidth, and similarly, the unpunctured PRS components PRS1 and PRS2 in occasion 812 in FIG. 8B may be jointly processed by the receiving entity, and the unpunctured PRS components PRS1 and PRS2 in occasion 822 in FIG. 8C may be jointly processed by the receiving entity.

Figure 10:
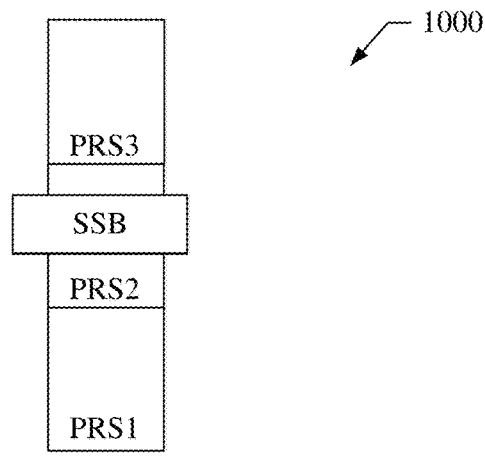
FIG. 10 illustrates an occasion that includes a punctured PRS component of an aggregated DL PRS received by the UE and all PRS components are unprocessed by the UE.

In an occasion in which one or more PRS components in an aggregated PRS are punctured, e.g., as illustrated in occasions 814 or 824 in FIG. 8B or 8C, respectively, or are not aligned in the time domain, e.g., as illustrated in occasion 804 in FIG. 8A, the receiving entity cannot process the PRS components jointly. FIG. 10 illustrates an occasion 1000 that includes a plurality of PRS components PRS1, PRS2, and PRS3 of an aggregated PRS, with one of the PRS components punctured. PRS component PRS2 is illustrated as being punctured by an SSB, but may be punctured by, e.g., UL (DL) symbols or may have a different slot structure than PRS components PRS1 and PRS3. In one implementation, if in one of the PRS components, e.g., PRS2, the PRS is dropped (e.g., punctured or not aligned in time domain) in one or more of the OFDM symbols, then the receiving entity may not process the remaining PRS components on these OFDM symbols. Thus, the receiving entity does not process any component of an aggregated PRS on the symbols that a collision exists or are not aligned in the time domain in at least one of the individual PRS components. In other words, if the PRS is dropped in one or more of the OFDM symbols in PRS component PRS2, the UE leaves unprocessed all remaining components PRS1 and PRS3 of the aggregated PRS on the OFDM symbols.

Figure 11:
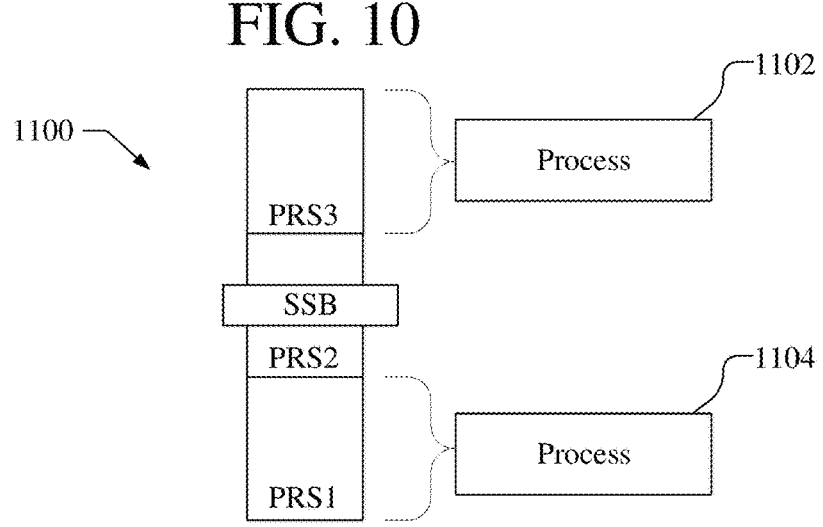
FIG. 11 illustrates an occasion that includes a punctured PRS component of an aggregated DL PRS received by the UE and remaining PRS components are separately processed by the UE.

FIG. 11 illustrates an occasion 1100 that includes a plurality of PRS components PRS1, PRS2, and PRS3 of an aggregated PRS, with PRS component PRS2 punctured by an SSB, but may be, e.g., punctured by UL (DL) symbols or may have a different slot structure than PRS components PRS1 and PRS3. In one implementation, if in one of the PRS components, e.g., PRS2, the PRS is dropped (e.g., punctured or not aligned in time domain) in one or more of the OFDM symbols, then the receiving entity may process 1102 and 1104 each one of the PRS components PRS1 and PRS3 independently. In other words, if the PRS is dropped in one or more of the OFDM symbols in PRS component PRS2, the receiving entity leaves unprocessed the PRS component PRS2 that is dropped and processes the remaining PRS components PRS1 and PRS3 separately on the one or more OFDM symbols, e.g., assuming that the remaining PRS components are transmitted from a separate antenna port. In occasion 1100, the accuracy requirements of the aggregated PRS may be the same as those defined for processing each of the PRS components of the aggregated PRS separately.

Figure 12:
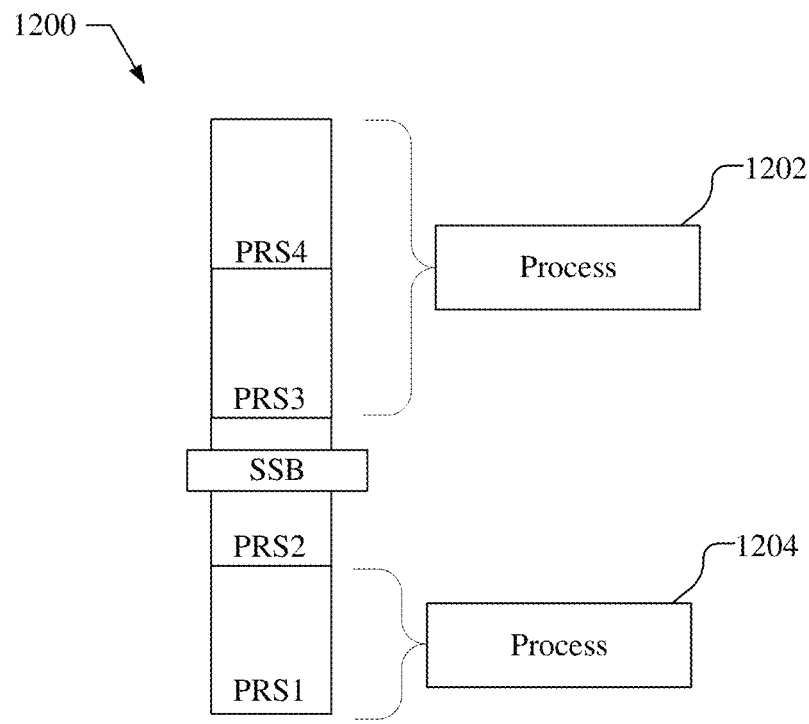
FIG. 12 illustrates an occasion that includes a punctured PRS component of an aggregated DL PRS received by the UE and remaining contiguous PRS components are jointly processed by the UE.

FIG. 12 illustrates an occasion 1200 that includes a plurality of PRS components PRS1, PRS2, PRS3, and PRS4 of an aggregated PRS, with PRS component PRS2 punctured by an SSB, but may be, e.g., punctured by UL (DL) symbols or may have a different slot structure than PRS components PRS1, PRS3 and PRS4. In one implementation, if in one of the PRS components, e.g., PRS2, the PRS is dropped in one or more of the OFDM symbols, then the receiving entity may jointly process 1202 contiguous PRS components PRS3 and PRS4 assuming that the PRS components PRS3 and PRS4 of the aggregated PRS are transmitted from a same antenna port, thereby increasing the effective PRS bandwidth of these PRS components. Any remaining unpunctured, non-contiguous PRS components in the aggregated PRS are processed 1204 by the receiving entity independently.

Figure 13:
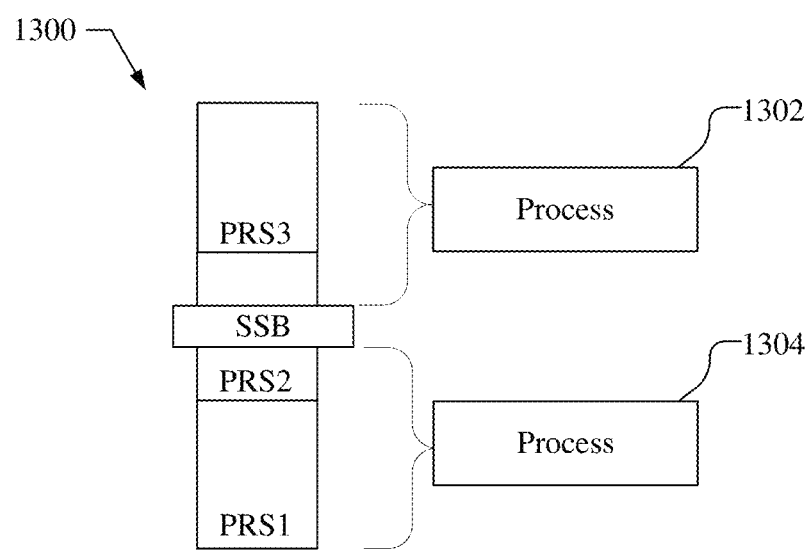
FIG. 13 illustrates an occasion that includes a punctured PRS component of an aggregated DL PRS received by the UE and the unpunctured positioning resource blocks (PRBs) across all the PRS components are jointly processed.

FIG. 13 illustrates an occasion 1300 that includes a plurality of PRS components PRS1, PRS2, and PRS3 of an aggregated PRS, with PRS component PRS2 punctured by an SSB, but may be, e.g., punctured by UL (DL) symbols or may have a different slot structure than PRS components PRS1 and PRS3. In one implementation, if in one of the PRS components, e.g., PRS2, the PRS is dropped in one or more of the OFDM symbols, then the receiving entity may jointly process 1302 and 1304 the unpunctured PRBs across all the PRS components PRS1, PRS, and PRS3. Thus, unpunctured PRBs in PRS2 that are contiguous with PRS3 are jointly processed 1302 and unpunctured PRBs in PRS2 that are contiguous with PRS1 are jointly processed 1304.

Additionally, each PRS component in an aggregated PRS may be transmitting with a different transmission power, e.g., EPRE, because PRS components may be physically located on a different component carrier and/or band. Accordingly, an indication of the relative transmission power between the PRS components in an aggregated PRS from the same TRP may be provided to the receiving entity, e.g., through higher layer signaling (e.g., LPP or RRC protocol), or lower signaling (e.g., MAC control element (CE) or DCI signaling). The UE may then perform positioning measurements using the aggregated DL PRS and the indication of the relative transmission power, e.g., to normalize the power of the PRS components. The indication of relative transmission power may be, for example, a power offset relative to a reference DL or UL Reference Signals (RS). The power offset may be, e.g., an offset of EPRE relative to the RS. The RS may be, e.g., a PRS component, a PRS resource from the same transmitting entity that is not part of the aggregated PRS, or a signal that is not a PRS. For example, one PRS component, e.g., with the lowest ID or as configured, may be a reference and the remaining power offsets may be indicated with respect to the reference. In another example, the indication of relative transmission power may be an indication of transmission power for each PRS component. If no indication of relative transmission power is provided to the receiving entity, the receiving entity may assume that the same transmission power, e.g., EPRE, is used for all of the PRS components in an aggregated PRS. Further, multiple power offsets may be indicated for different collections of PRS components. For example, with four PRS components, a first indication of the relative transmission power may be provided for a first pair of PRS components and a second indication of the relative transmission power may be provided for a second pair of PRS components.

When the receiving entity receives aggregated PRS, in order to benefit from the higher accuracy from jointly processing the PRS components, the receiving entity may measure the aggregated PRS instance when the constraints on the configuration of the PRS components are the same or similar, e.g., within a predetermined threshold. If the constraints on the configuration of the PRS components in an aggregated PRS instance are not the same or similar, the PRS components are not aligned, and accordingly, the receiving entity may process the PRS components separately. Thus, the PRS components of an aggregated PRS to be processed jointly should have the same or similar, e.g., within a predetermined threshold, constraints including one or more of symbol indices that are not separated by more than a predefined number of symbols (e.g., 14 number of symbols), slot indices that are not separated by more than a predefined number of slots (e.g., 10 number of slots), frames that are not separated by more than a predefined number of frames (e.g., 10 number of frames), subframes that are not separated by more than a predefined number of subframes (e.g., 10 number of subframes), a same periodicity, a same comb type, a same number of symbols, a same quasi-colocation (QCL) information, a "Start PRB" that is within a predefined threshold (e.g., the difference may not be more than 24 PRBs), a same subcarrier spacing, a same cyclic prefix (CP), a same muting configuration, and bandwidths that are within a predefined threshold (e.g., the ratio between the maximum bandwidth to the minimum bandwidth may not be more than 2), or a combination thereof. It should be understood that the specific numbers and thresholds provided above are exemplary and are not limiting, e.g., other numbers and thresholds may be used if desired.

Additionally, it may be useful for the UE to provide its capabilities with respect to its abilities to receive and process aggregated DL PRS. For example, currently, a UE may provide capabilities including the duration of DL PRS symbols in units of ms that the UE can process every T ms assuming 272 PRB allocation. The UE may additionally provide an indication of its capability to receive and process aggregated PRS. If the UE indicates that it supports X ms of PRS symbols every T ms assuming 272 PRBs, then it may be understood that the UE also supports X/N ms of PRS symbols for an aggregated PRS of 272 PRBs for each of the N PRS components. The duration of DL PRS symbols that the UE can process in an amount of time, however, may not scale linearly with the number N of PRS components. Accordingly, the UE may include in a capability message an indication of a duration of DL PRS symbols that the UE can process in an amount of time for different numbers N of PRS components in an aggregated PRS For example, the capabilities message may indicate a duration of DL PRS symbols in units of ms the UE can process every T ms assuming 272 PRB allocation for different values of the number N of PRS components of an aggregated PRS. Thus, the UE may provide a capabilities message that indicates different durations of DL PRS symbols that the UE can process in an amount of time based on the number N of PRS components.

Figure 14:
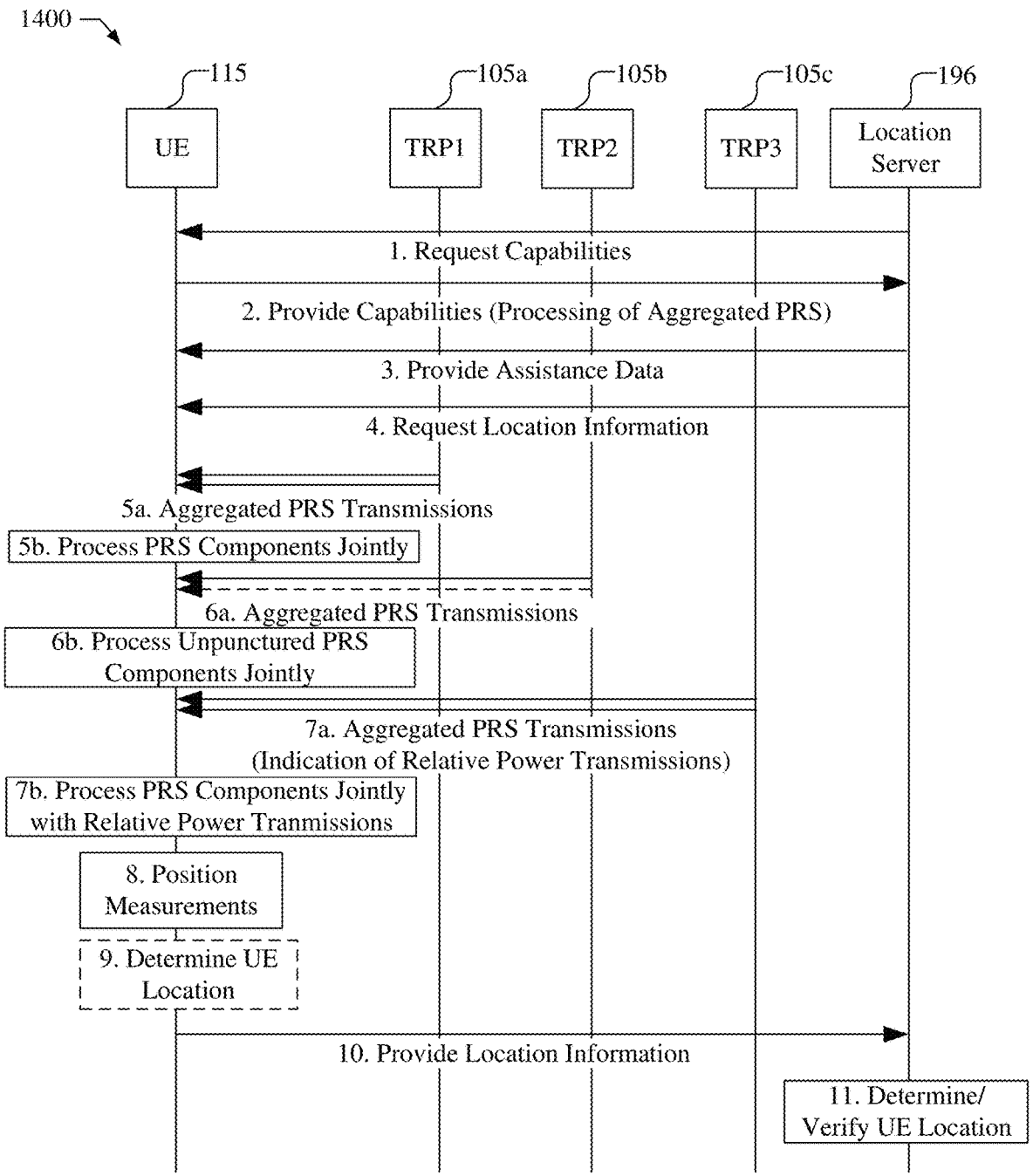
FIG. 14 is a message flow that illustrates various messages sent between components of the communication system, during a location session for performing positioning measurements with aggregated DL PRS.

FIG. 14 is a message flow 1400 that illustrates various messages sent between components of the communication system 100 depicted in FIG. 1, during a location session for performing positioning measurements with aggregated DL PRS with TRPs 105a, 105b, and 105c. It should be understood, however, that one or more of the TRPs 105a, 105b, and 105c may be replaced with a UE, and similar positioning measurements may be performed using sidelink (SL) PRS from one or more UEs, or a combination of DL PRS from TRPs 105 and SL PRS from one or more UEs. Location server 196 may be, e.g., an LMF for a 5G NR network. Location server 196 may be located remotely in the core network, e.g., core network 190 shown in FIG. 1 or may be coincident with a TRP, such as a serving TRP 105*a*. The UE 115 may be configured to perform UE assisted positioning or UE based positioning, in which the UE itself determines its location using, for example, assistance data provided to it. In the message flow 1400, it is assumed that the UE 115 and location server 196 communicate using the LPP positioning protocol referred to earlier, although use of NPP or a combination of LPP and NPP or other future protocol, such as NRPPa, is also possible.

At stage 1, the location server 196 sends a Request Capabilities message to the UE 115, e.g., to request the capabilities from the UE 115.

At stage 2, the UE 115 returns a Provide Capabilities message to the location server 196, in which the UE 115 provides its capabilities to perform positioning. The UE 115 may provide an indication of the UE's capability to receive and process aggregated PRS. For example, the UE 115 may indicate that it is capable of processing aggregated PRS. The UE 115 may further indicate that it supports X ms of PRS symbols every T ms assuming 272 PRBs, and it may be understood that the UE 115 also supports X/N ms of PRS symbols for an aggregated PRS of 272 PRBs for each of the N PRS components. In one implementation, the UE 115 may provide an indication of a duration of DL PRS symbols that UE 115 can process in an amount of time for different numbers N of PRS components in an aggregated PRS. For example, the capabilities message may indicate a duration of DL PRS symbols in units of ms the UE 115 can process every T ms assuming 272 PRB allocation for different values of the number N of PRS components of an aggregated PRS.

At stage 3, the location server 196 may send an LPP Provide Assistance Data message to the UE 115 to provide positioning assistance data to configure the UE 115 to acquire and process aggregated DL PRS transmissions from TRP1 105*a*, TRP2 105*b*, and TRP3 105*c*, e.g., the assistance data may include the configuration for the aggregated DL PRS for each of the TRPs. If the UE 115 is expected to perform the location calculation, e.g., in a UE based positioning procedure, the assistance data may include the physical locations of the TRPs.

At stage 4, the location server 196 may send an LPP Request Location Information message to the UE 115 to request the UE 115 to measure DL PRS transmission from the TRPs. For example, the location server 196 may request measurements of RSTD, if OTDOA is used, or other types of measurements. The location server 196 may also indicate whether UE based positioning is requested whereby the UE 115 determines its own location.

At stage 5a, the UE receives a number of PRS components, illustrated with separate arrows, for an aggregated DL PRS transmissions from the TRP1 105*a*. It should be understood that while the PRS components are illustrated with separate arrows, the PRS components are separated in the frequency domain and not the time domain. Each PRS component may be a separate PRS resource, each associated with a contiguous frequency-domain bandwidth, or a plurality of contiguous frequency-domain bandwidths spanned by a single PRS resource. For example, the PRS components may be transmitted by the TRP1 105*a* on one or more different component carriers, bands, frequency layers, or bandwidths in a same band. The PRS components transmitted by TRP1 105*a* are configured with the same, or similar (within a predetermined threshold) constraints, such as one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof. The PRS components are unpunctured and are aligned in time.

At stage 5b, the UE 115 jointly processes the PRS components of the aggregated DL PRS received at stage 5a that are configured with the same constraints, assuming that the PRS components of the aggregated DL PRS are transmitted from a same antenna port of TRP1 105*a*, thereby increasing the effective PRS bandwidth, e.g., as illustrated in FIG. 9. The UE 115 may separately process the PRS components of the aggregated DL PRS received at stage 5a that are not configured with the same constraints.

At stage 6a, the UE receives a number of PRS components, illustrated with separate arrows, for an aggregated DL PRS transmission from the TRP2 105*b*. It should be understood that while the PRS components are illustrated with separate arrows, the PRS components are separated in the frequency domain and not the time domain. The PRS components in the aggregated DL PRS transmissions may be similar to that shown in stage 5a, but as illustrated by the dotted arrow in stage 6a, a PRS component is punctured or not aligned so that the PRS in the at least one PRS component is dropped in one or more symbols. For example, the PRS component may be punctured by colliding with a synchronization signal block (SSB) in a frequency layer, colliding with uplink symbols in a frequency layer or may be misaligned in the time domain by having a different slot structure, or a combination thereof.

At stage 6b, the UE 115 may jointly process any unpunctured PRS components of the aggregated DL PRS received at stage 6a, assuming that the PRS components of the aggregated DL PRS are transmitted from a same antenna port of TRP2 105*b*. As discussed above, the UE 115 may process punctured PRS components differently. For example, in an occasion in which a PRS component is punctured, the UE 115 may leave unprocessed all remaining PRS components of the at least one aggregated PRS on the one or more symbols, e.g., as illustrated in FIG. 10. In another implementation, in an occasion in which a PRS component is punctured, the UE 115 may leave unprocessed the punctured PRS component and may process the remaining PRS components separately on the one or more symbols, e.g., as illustrated in FIG. 11. The remaining PRS components, for example, may be processed assuming that the remaining PRS components are transmitted from a separate antenna port. The remaining PRS components may be processed with an accuracy requirement that corresponds to each of the remaining PRS component separately. In another implementation, in an occasion in which a PRS component is punctured, the UE 115 may leave unprocessed the punctured PRS component and may jointly process any remaining contiguous PRS components on the one or more symbols, e.g., as illustrated in FIG. 12. In another implementation, in an occasion in which a PRS component is punctured, the UE 115 may process unpunctured PRBs in all PRS components jointly on the one or more symbols, e.g., as illustrated in FIG. 13.

At stage 7a, the UE receives a number of PRS components, illustrated with separate arrows, for an aggregated DL PRS transmission from the TRP3 105c. It should be understood that while the PRS components are illustrated with separate arrows, the PRS components are separated in the frequency domain and not the time domain. The PRS components in the aggregated DL PRS transmissions may be similar to that shown in stage 5a. An indication of the relative transmission power between the PRS components of the aggregated PRS is also received by the UE 115. The indication of relative transmission power may be received with the PRS or in a separate message, and may be provided in assistance data received at stage 3. For example, the indication of the relative transmission power may be received through higher layer signaling (e.g., LPP or RRC protocol), or lower signaling (e.g., MAC CE or DCI signaling). The indication of relative transmission power between the PRS components, for example, may be a power offset relative to a reference DL Reference Signals (RS), which may be, e.g., one of the PRS components, a PRS resource from the same TRP that is not part of the aggregated PRS, or a signal that is not a PRS. The indication of relative transmission power may be a power offset of Energy Per Resource Element (EPRE) relative to the reference DL RS. There may be multiple indication of relative transmission power, e.g., each for a different set of power components. In some implementations, the indication of relative transmission power between the PRS components may be an indication of transmission power for each PRS component.

At stage 7b, the UE 115 jointly processes the PRS components of the aggregated DL PRS received at stage 7a, assuming that the PRS components of the aggregated DL PRS are transmitted from a same antenna port of TRP3 105c, and using the indication of relative transmission power, e.g., to normalize the power of the PRS components.

At stage 8, the UE 115 may perform the desired position measurements using the acquired and processed aggregated DL PRS received from TRP1 105a, TRP2 105b and TRP3 105c. The UE 115, for example, may perform downlink based positioning measurements, such as TOA, RSTD, OTDOA, Rx-Tx, or RSRP, etc., or downlink and uplink based positioning methods, e.g., RTT if uplink reference signals are used (not shown in FIG. 14).

At stage 9, the UE 115 may optionally determine the UE location, e.g., in a UE based positioning procedure, using the positioning measurements from stage 8 and known locations of the TRPs, e.g., acquired with the assistance data in stage 3.

At stage 10, the UE 115 send a Provide Location Information message to the location server 196 and includes the PRS based positioning measurements obtained at stage 8 and/or the UE location determined at optional stage 9.

At stage 11, the location server 196 determines the UE location based on any PRS based positioning measurements received at stage 10, or may verify the UE location received at stage 10. The UE location may be forwarded to an external client (not shown).

Figure 15:
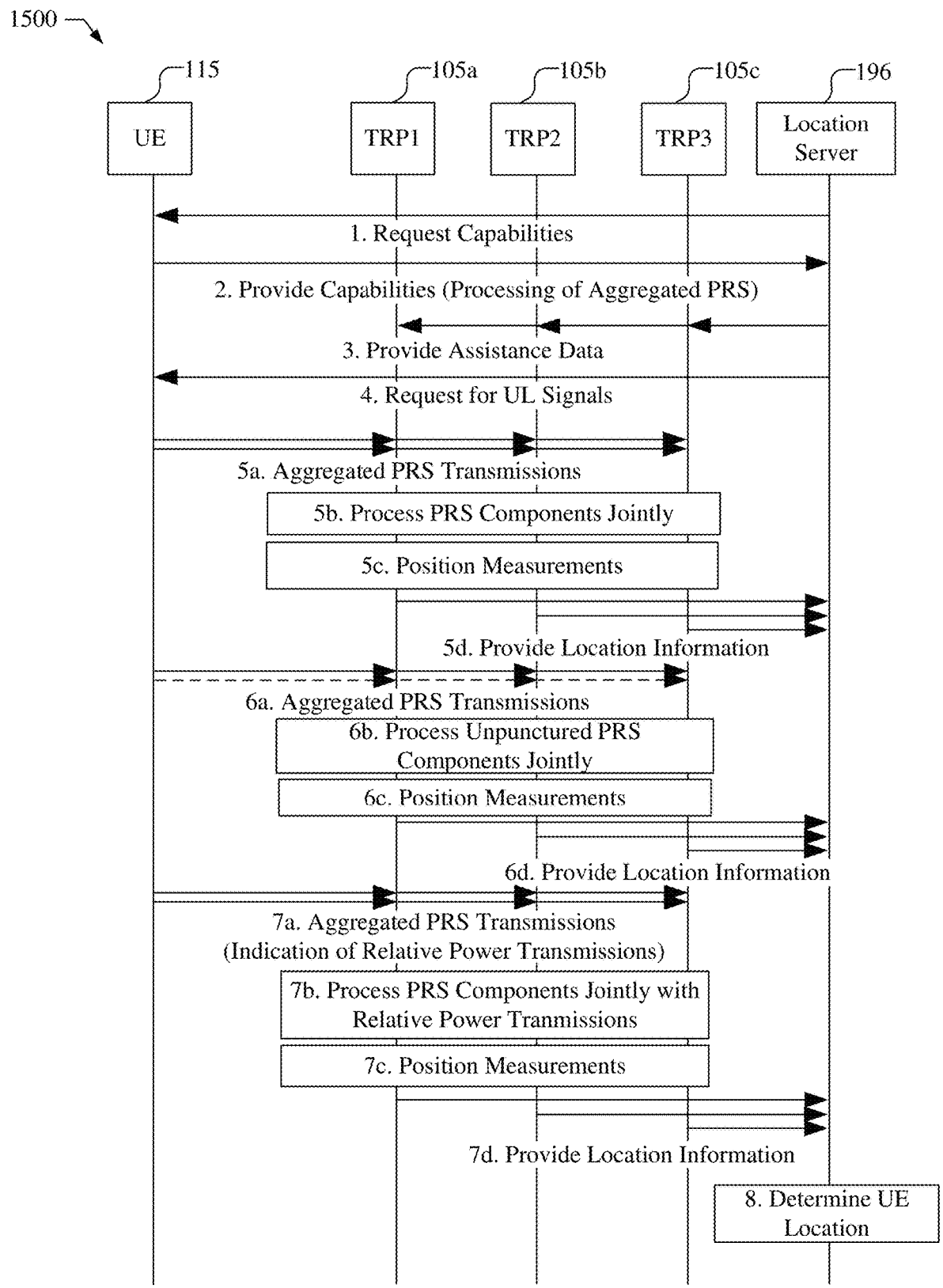
FIG. 15 is a message flow that illustrates various messages sent between components of the communication system, during a location session for performing positioning measurements with aggregated UL PRS.

FIG. 15 is a message flow 1500 that illustrates various messages sent between components of the communication system 100 depicted in FIG. 1, during a location session for performing positioning measurements with aggregated UL PRS with TRPs 105a, 105b, and 105c. It should be understood, however, that one or more of the TRPs 105a, 105b, and 105c may be replaced with a UE, and similar positioning measurements may be performed by one or more UEs, or a combination of TRPs 105 and UEs. Location server 196 may be, e.g., an LMF for a 5G NR network. Location server 196 may be located remotely in the core network, e.g., core network 190 shown in FIG. 1 or may be coincident with a TRP, such as a serving TRP 105a. In the message flow 1500, it is assumed that the UE 115 and location server 196 communicate using the LPP positioning protocol referred to earlier, although use of NPP or a combination of LPP and NPP or other future protocol, such as NRPPa, is also possible.

At stage 1, the location server 196 sends a Request Capabilities message to the UE 115, e.g., to request the capabilities from the UE 115.

At stage 2, the UE 115 returns a Provide Capabilities message to the location server 196, in which the UE 115 provides its capabilities to perform positioning. The UE 115 may provide an indication of the UE's capability to transmit aggregated UL PRS, e.g., aggregated SRS.

At stage 3, the location server 196 may send a Configuration message to the TRP1 105a, TRP2 105b, and TRP3 105c (sometimes collectively referred to as TRPs 105) to provide PRS configuration constraints for ULPRS transmissions from UE 115.

At stage 4, the location server 196 may send an LPP Request for UL Signals message to the UE 115 to request the UE 115 begin UL PRS transmission to the TRPs. Alternatively, a serving base station, e.g., gNB, may send an RRC request for UL signals. For sidelink, the location server 196 (or serving base station, e.g., gNB) may send a PCS request for UL signals. The request may include details about the required UL PRS (e.g. coding, bandwidth, carrier frequency, frequency and timing of transmission, periodicity, and/or a start time and end time for transmission).

At stage 5a, the UE 115 transmits a number of PRS components, illustrated with separate arrows, for an aggregated UL PRS transmission to the TRPs 105. The UE 115 may continue to periodically transmit the PRS components until the requested end time or until transmission is canceled or reconfigured by the location server 196. It should be understood that while the PRS components are illustrated with separate arrows, the PRS components are separated in the frequency domain and not the time domain Each PRS component may be a separate PRS resource, each associated with a contiguous frequency-domain bandwidth, or a plurality of contiguous frequency-domain bandwidths spanned by a single PRS resource. For example, the PRS components may be transmitted by the UE 115 on one or more different component carriers, bands, frequency layers, or bandwidths in a same band. The PRS components transmitted by UE 115 are configured with the same, or similar (within a predetermined threshold) constraints, such as one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof. The PRS components are unpunctured and are aligned in time.

At stage 5b, each of the TRPs 105 jointly processes the PRS components of the aggregated UL PRS received at stage 5a that are configured with the same constraints, assuming that the PRS components of the aggregated DL PRS are transmitted from a same antenna port of UE 115, thereby increasing the effective PRS bandwidth, e.g., as illustrated in FIG. 9. The TRPs 105 may separately process the PRS components of the aggregated UL PRS received at stage 5a that are not configured with the same constraints.

At stage 5c, the TRPs 105 may perform the desired position measurements using the acquired and processed aggregated UL PRS received from UE 115 at stages 5a and 5b. The TRPs 105, for example, may perform uplink based positioning measurements, such as TOA, RSTD, OTDOA, Rx-Tx, or RSRP, etc., or downlink and uplink based positioning methods, e.g., RTT if downlink reference signals are used (not shown in FIG. 15).

At stage 5d, the TRPs 105 may send a Provide Location Information message to the location server 196 and may include the PRS based positioning measurements obtained at stage 5c.

At stage 6a, the UE transmits a number of PRS components, illustrated with separate arrows, for an aggregated UL PRS transmission to the TRPs 105. It should be understood that while the PRS components are illustrated with separate arrows, the PRS components are separated in the frequency domain and not the time domain. The PRS components in the aggregated UL PRS transmissions may be similar to that shown in stage 5a, but as illustrated by the dotted arrow in stage 6a, a PRS component is punctured or not aligned so that the PRS in the at least one PRS component is dropped in one or more symbols. For example, the PRS component may be punctured by colliding with a synchronization signal block (SSB) in a frequency layer, colliding with downlink symbols in a frequency layer, or may be misaligned in the time domain by having a different slot structure, or a combination thereof.

At stage 6b, each of the TRPs 105 jointly process any unpunctured and aligned PRS components of the aggregated UL PRS received at stage 6a, assuming that the PRS components of the aggregated ULPRS are transmitted from a same antenna port of UE 115. As discussed above, the TRPs 105 may process punctured or unaligned PRS components differently. For example, in an occasion in which a PRS component is punctured or not aligned in the time domain, the TRPs 105 may leave unprocessed all remaining PRS components of the at least one aggregated PRS on the one or more symbols, e.g., as illustrated in FIG. 10. In another implementation, in an occasion in which a PRS component is punctured or not aligned in the time domain, the TRPs 105 may leave unprocessed the punctured or unaligned PRS component and may process the remaining PRS components separately on the one or more symbols, e.g., as illustrated in FIG. 11. The remaining PRS components, for example, may be processed assuming that the remaining PRS components are transmitted from a separate antenna port. The remaining PRS components may be processed with an accuracy requirement that corresponds to each of the remaining PRS component separately. In another implementation, in an occasion in which a PRS component is punctured or not aligned in the time domain, the TRPs 105 may leave unprocessed the punctured PRS component and may jointly process any remaining contiguous PRS components on the one or more symbols, e.g., as illustrated in FIG. 12. In another implementation, in an occasion in which a PRS component is punctured or not aligned in the time domain, the TRPs 105 may process unpunctured PRBs in all PRS components jointly on the one or more symbols, e.g., as illustrated in FIG. 13.

At stage 6c, the TRPs 105 may perform the desired position measurements using the acquired and processed aggregated UL PRS received from UE 115 at stages 6a and 6b. The TRPs 105, for example, may perform uplink based positioning measurements, such as TOA, RSTD, OTDOA, Rx-Tx, or RSRP, etc., or downlink and uplink based positioning methods, e.g., RTT if downlink reference signals are used (not shown in FIG. 15).

At stage 6d, the TRPs 105 may send a Provide Location Information message to the location server 196 and may include the PRS based positioning measurements obtained at stage 6c.

At stage 7a, the UE 115 transmits a number of PRS components, illustrated with separate arrows, for an aggregated UL PRS transmission to the TRPs 105. It should be understood that while the PRS components are illustrated with separate arrows, the PRS components are separated in the frequency domain and not the time domain. The PRS components in the aggregated UL PRS transmissions may be similar to that shown in stage 5a. An indication of the relative transmission power between the PRS components of the aggregated PRS is also received by the TRPs 105. The indication of relative transmission power may be received with the PRS or in a separate message. For example, the indication of the relative transmission power may be received through higher layer signaling (e.g., LPP or RRC protocol), or lower signaling (e.g., MAC CE or DCI signaling). The indication of relative transmission power between the PRS components, for example, may be a power offset relative to a reference UL Reference Signals (RS), which may be, e.g., one of the PRS components, a PRS resource from the same TRP that is not part of the aggregated PRS, or a signal that is not a PRS. The indication of relative transmission power may be a power offset of Energy Per Resource Element (EPRE) relative to the reference UL RS. There may be multiple indication of relative transmission power, e.g., each for a different set of power components. In some implementations, the indication of relative transmission power between the PRS components may be an indication of transmission power for each PRS component.

At stage 7b, each of the TRPs 105 jointly processes the PRS components of the aggregated UL PRS received at stage 7a, assuming that the PRS components of the aggregated UL PRS are transmitted from a same antenna port of UE 115, and using the indication of relative transmission power, e.g., to normalize the power of the PRS components.

At stage 7c, the TRPs 105 may perform the desired position measurements using the acquired and processed aggregated UL PRS received from UE 115 at stages 7a and 7b. The TRPs 105, for example, may perform uplink based positioning measurements, such as TOA, RSTD, OTDOA, Rx-Tx, or RSRP, etc., or downlink and uplink based positioning methods, e.g., RTT if downlink reference signals are used (not shown in FIG. 15).

At stage 7d, the TRPs 105 may send a Provide Location Information message to the location server 196 and may include the PRS based positioning measurements obtained at stage 7c.

At stage 8, the location server 196 determines the UE location based on any PRS based positioning measurements received at stages 5d, 6d, or 7d. The UE location may be forwarded to an external client (not shown).

Figure 16:
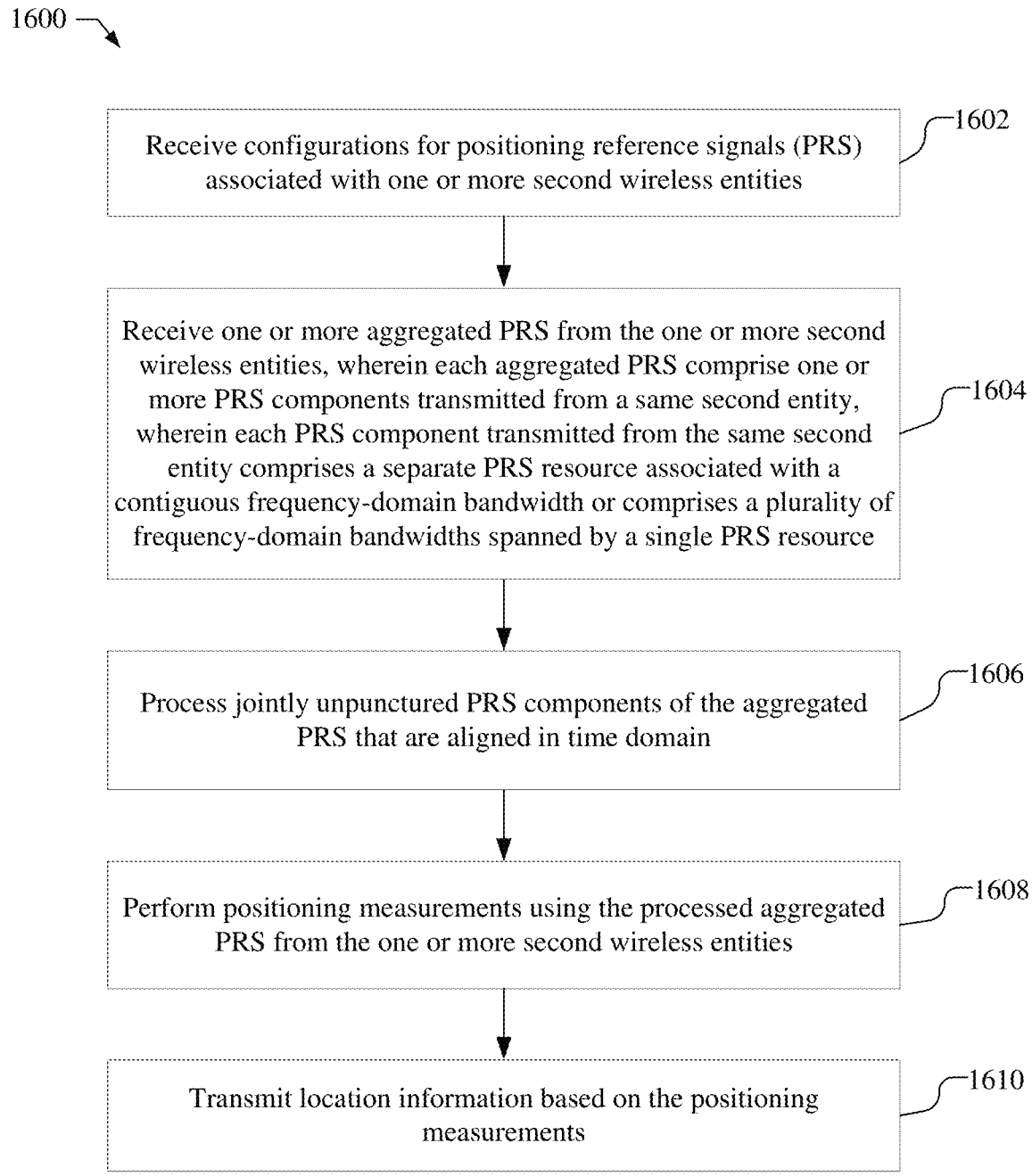
FIG. 16 shows a flowchart for an exemplary method for supporting positioning of a UE.

FIG. 16 shows a flowchart for an exemplary method 1600 for supporting positioning of a user equipment (UE) in a wireless network that is performed by a first wireless entity, such as UE 115 or a TRP 105, in a manner consistent with disclosed implementation.

At block 1602, the first wireless entity may receive configurations for positioning reference signals (PRS) associated with one or more second wireless entities, e.g., as discussed at stage 3 of FIG. 14 and stage 3 of FIG. 15. At block 1604, the first wireless entity may receive one or more aggregated PRS from one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, e.g., as discussed at stages 5a, 6a, and 7a of FIG. 14 or stages 5a, 6a, and 7a of FIG. 15. At block 1606, the second wireless entity may jointly process unpunctured PRS components of the aggregated PRS that are aligned in time domain, e.g., as discussed at stages 5b, 6b, and 7b of FIG. 14 or stages 5b, 6b, and 7b of FIG. 15. For example, the unpunctured PRS components of the aggregated PRS that are aligned in time domain may be jointly processed assuming that the PRS components of the aggregated UL PRS are transmitted from a same antenna port. At block 1608, the first wireless entity may perform positioning measurements using the processed aggregated PRS from the one or more second wireless entities, e.g., as discussed at stage 8 of FIG. 14 or stages 5c, 6c, and 7c of FIG. 15. At block 1610, the first wireless entity may transmit location information based on the positioning measurements, e.g., to a location server or a base station, e.g., as discussed at stage 10 of FIG. 14 or stages 5d, 6d, and 7d of FIG. 15.

In one implementation, the first wireless entity is the UE and the one or more second wireless entities may comprise transmission reception points (TRPs) in a network entity and the one or more aggregated PRS may comprise downlink (DL) aggregated PRS. For example, the configurations for the PRS associated with the one or more second wireless entities may be received from a location server, such as an LMF.

In one implementation, the first wireless entity is the UE and the one or more second wireless entities may comprise a second UE and the one or more aggregated PRS may comprise sidelink (SL) aggregated PRS.

In one implementation, the first wireless entity is a transmission reception point (TRP) and the one or more second wireless entities comprise the UE and the one or more aggregated PRS comprise uplink (UL) aggregated PRS.

In one implementation, the plurality of frequency-domain bandwidths spanned by the single PRS resource may be contiguous frequency-domain bandwidths.

In one implementation, the location information may be the positioning measurements or a position estimation for the first wireless entity determined using the positioning measurements, e.g., as discussed at stages 9 and 10 of FIG. 14.

In one implementation, each PRS component from the same second wireless entity is transmitted on one or more different component carriers, bands, frequency layers, or bandwidths in a same band, e.g., as discussed at stage 5a of FIG. 14 or stage 5a of FIG. 15.

In one implementation, at least one PRS component of at least one aggregated PRS is punctured or is not aligned with other PRS components in the time domain so that the PRS in the at least one PRS component is dropped in one or more symbols, e.g., as discussed at stages 6a of FIG. 14 or stage 6a of FIG. 15. For example, the at least one PRS component is punctured by one or more of having a different slot structure, collision with a synchronization signal block (SSB) in a frequency layer, collision with uplink symbols in a frequency layer, collision with downlink symbols in a frequency layer, or a combination thereof, e.g., as discussed at stages 6a of FIG. 14 or stage 6a of FIG. 15. In one implementation, the first wireless entity may leave unprocessed all remaining PRS components of the at least one aggregated PRS on the one or more symbols, e.g., as discussed at stages 6b of FIG. 14 or stage 6b of FIG. 15. In one implementation, the first wireless entity may leave unprocessed the at least one PRS component that is punctured and may process the remaining PRS components separately on the one or more symbols, e.g., as discussed at stages 6b of FIG. 14 or stage 6b of FIG. 15. For example, the remaining PRS components may be processed assuming that the remaining PRS components are transmitted from a separate antenna port, e.g., as discussed at stages 6b of FIG. 14 or stage 6b of FIG. 15. The remaining PRS components may be processed with an accuracy requirement that corresponds to each of the remaining PRS component separately, e.g., as discussed at stages 6b of FIG. 14 or stage 6b of FIG. 15. In one implementation, the first wireless entity may leave unprocessed the at least one PRS component that is punctured and processing remaining contiguous PRS components jointly on the one or more symbols, e.g., as discussed at stages 6b of FIG. 14 or stage 6b of FIG. 15. In one implementation, the first wireless entity may process unpunctured physical resource blocks (PRBs) in all PRS components jointly on the one or more symbols, e.g., as discussed at stages 6b of FIG. 14 or stage 6b of FIG. 15.

Figure 17:
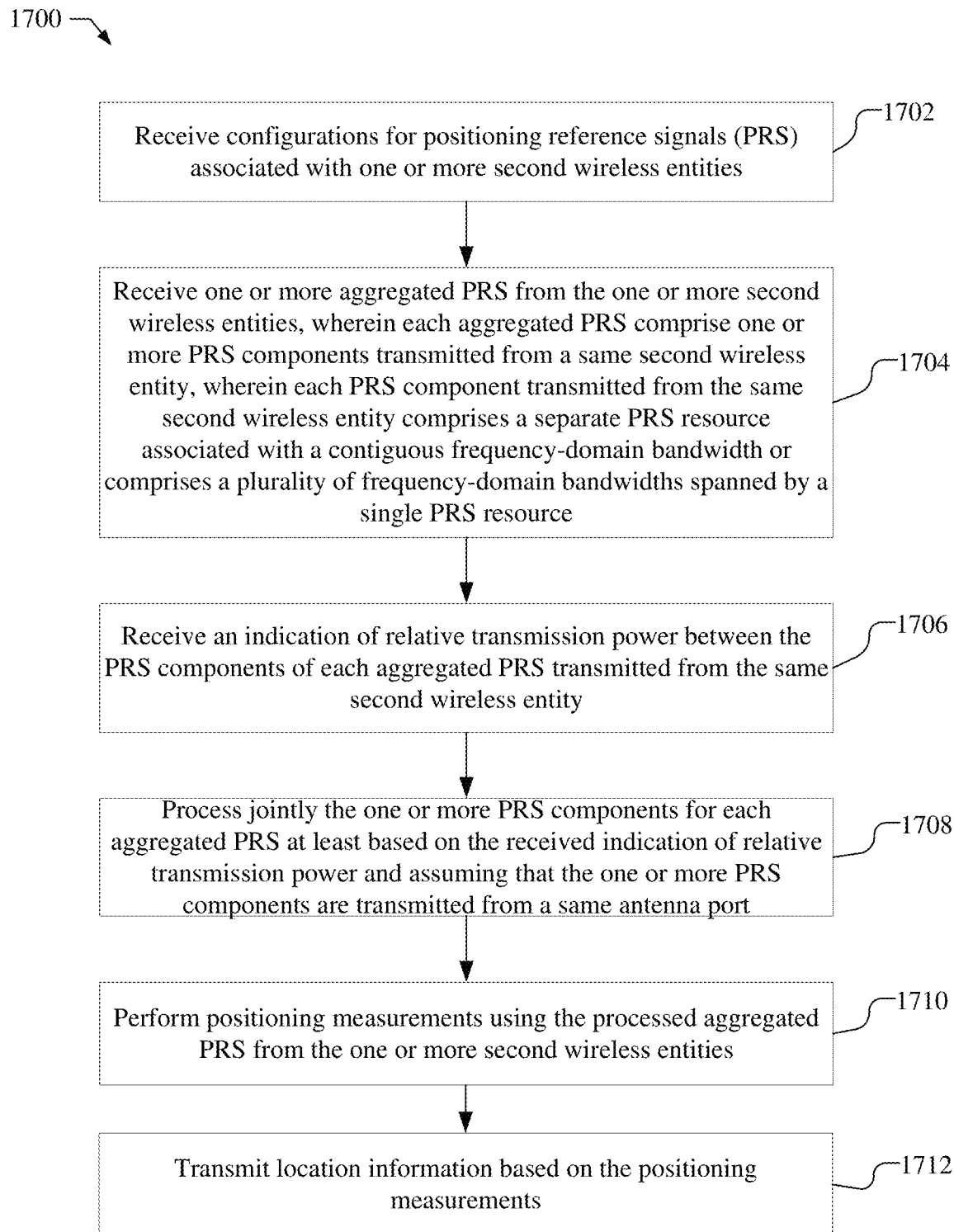
FIG. 17 shows a flowchart for another exemplary method for supporting positioning of a UE.

FIG. 17 shows a flowchart for an exemplary method 1700 for supporting positioning of a user equipment (UE) that is performed by a first wireless entity such as UE 115 or a TRP 105, in a manner consistent with disclosed implementation.

At block 1702, the first wireless entity may receive configurations for positioning reference signals (PRS) associated with one or more second wireless entities, e.g., as discussed at stage 3 of FIG. 14 or stage 3 of FIG. 15. At block 1704, the first wireless entity may receive one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, e.g., as discussed at stages 5a, 6a, and 7a of FIG. 14 or stages 5a, 6a, and 7a of FIG. 15. At block 1706, the first wireless entity may receive an indication of relative transmission power between the PRS components of each aggregated PRS transmitted from the same second wireless entity, e.g., as discussed at stage 7a of FIG. 14 or stage 7a of FIG. 15. At block 1708, the first wireless entity may process jointly the one or more PRS components for each aggregated PRS at least based on the received indication of relative transmission power, e.g., as discussed at stage 7b of FIG. 14 or stage 7b of FIG. 15. At block 1710, the first wireless entity may perform positioning measurements using the processed aggregated PRS from the one or more second wireless, e.g., as discussed at stage 8 of FIG. 14 or stage 7c of FIG. 15. At block 1712, the first wireless entity may transmit location information based on the positioning measurements, e.g., to a location server or a base station, e.g., as discussed at stage 10 of FIG. 14 or stage 7d of FIG. 15.

In one implementation, the first wireless entity is the UE and the one or more second wireless entities comprise transmission reception points (TRPs) in a network entity and the one or more aggregated PRS comprise downlink (DL) aggregated PRS. For example, the configurations for the PRS associated with the one or more second wireless entities may be received from a location server, such as an LMF.

In one implementation, the first wireless entity is the UE and the one or more second wireless entities comprise a second UE and the one or more aggregated PRS comprise sidelink (SL) aggregated PRS.

In one implementation, the first wireless entity is a transmission reception point (TRP) and the one or more second wireless entities comprise the UE and the one or more aggregated PRS comprise uplink (UL) aggregated PRS.

In one implementation, the plurality of frequency-domain bandwidths spanned by the single PRS resource may be contiguous frequency-domain bandwidths.

In one implementation, the indication of relative transmission power between the PRS components of each aggregated PRS transmitted from the same second wireless entity comprises a power offset relative to a Reference Signals (RS), e.g., as discussed at stage 7a of FIG. 14 or stage 7a of FIG. 15. The RS may be, e.g., a PRS component, a PRS resource from the same second wireless entity that is not part of the aggregated PRS or a signal that is not a PRS. The power offset may be an offset of Energy Per Resource Element (EPRE) relative to the RS.

In one implementation, the indication of relative transmission power between the PRS components of each aggregated PRS transmitted from the same second wireless entity comprises a first power offset for a first PRS component relative to a second PRS component and a second power offset for a third PRS component relative to a fourth PRS component, e.g., as discussed at stage 7a of FIG. 14 or stage 7a of FIG. 15.

In one implementation, the indication of relative transmission power between the PRS components of each aggregated PRS transmitted from the same second wireless entity may be an indication of transmission power for each PRS component, e.g., as discussed at stage 7a of FIG. 14 or stage 7a of FIG. 15.

In one implementation, each PRS component of each aggregated PRS transmitted from the same second wireless entity is transmitted on one or more different component carriers, bands, frequency layers, or bandwidths in a same band, e.g., as discussed at stage 5a of FIG. 14 or stage 5a of FIG. 15.

Figure 18:
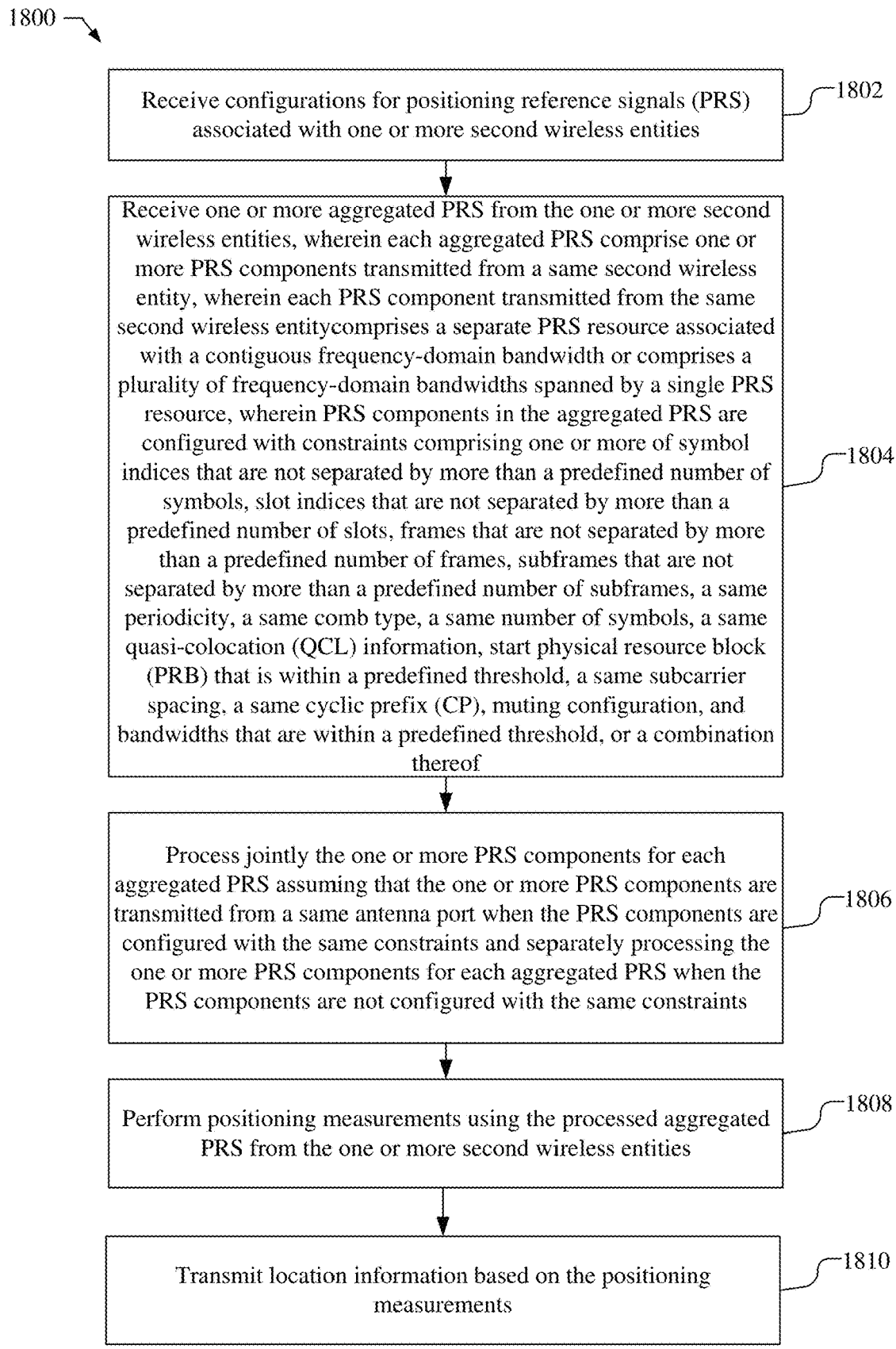
FIG. 18 shows a flowchart for another exemplary method for supporting positioning of a UE.

FIG. 18 shows a flowchart for an exemplary method 1800 for supporting positioning of a user equipment (UE) that is performed by the first wireless entity such as UE 115 or a TRP 105, in a manner consistent with disclosed implementation.

At block 1802, the first wireless entity may receive configuration for positioning reference signals (PRS) associated with one or more second wireless entities, e.g., as discussed at stage 3 of FIG. 14 or stage 3 of FIG. 15. At block 1804, the first wireless entity may receive one or more aggregated PRS from one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof, e.g., as discussed at stages 5a, 6a, and 7a of FIG. 14 or stages 5a, 6a, and 7a of FIG. 15. At block 1806, the first wireless entity may process jointly the one or more PRS components for each aggregated PRS when the PRS components are configured with the same constraints and separately processing the one or more components for each aggregated PRS when the PRS components are not configured with the same constraints, e.g., as discussed at stages 5b, 6b, and 7b of FIG. 14 or stages 5b, 6b, and 7b of FIG. 15. At block 1808, the first wireless entity may perform positioning measurements using the processed one or more aggregated PRS from the one or more second wireless, e.g., as discussed at stage 8 of FIG. 14 or stages 5c, 6c, and 7c of FIG. 15. At block 1810, the first wireless entity transmits location information based on the positioning measurements, e.g., to a location server or a base station, e.g., as discussed at stage 10 of FIG. 14 or stage 8 of FIG. 15.

In one implementation, the first wireless entity is the UE and the one or more second wireless entities comprise transmission reception points (TRPs) in a network entity and the one or more aggregated PRS comprise downlink (DL) aggregated PRS. For example, the configurations for the PRS associated with the one or more second wireless entities may be received from For example, the network entity may be a location server, such as an LMF.

In one implementation, the first wireless entity is the UE and the one or more second wireless entities comprise a second UE and the one or more aggregated PRS comprise sidelink (SL) aggregated PRS.

In one implementation, the first wireless entity is a transmission reception point (TRP) and the one or more second wireless entities comprise the UE and the one or more aggregated PRS comprise uplink (UL) aggregated PRS.

In one implementation, the plurality of frequency-domain bandwidths spanned by the single PRS resource may be contiguous frequency-domain bandwidths.

In one implementation, the predefined number of symbols may be 0 so that the PRS components are transmitted simultaneously.

In one implementation, each PRS component from the same second wireless entity is transmitted on one or more different component carriers, bands, frequency layers, or bandwidths in a same band, e.g., as discussed at stage 5a of FIG. 14 or stage 5a of FIG. 15.

Figure 19:
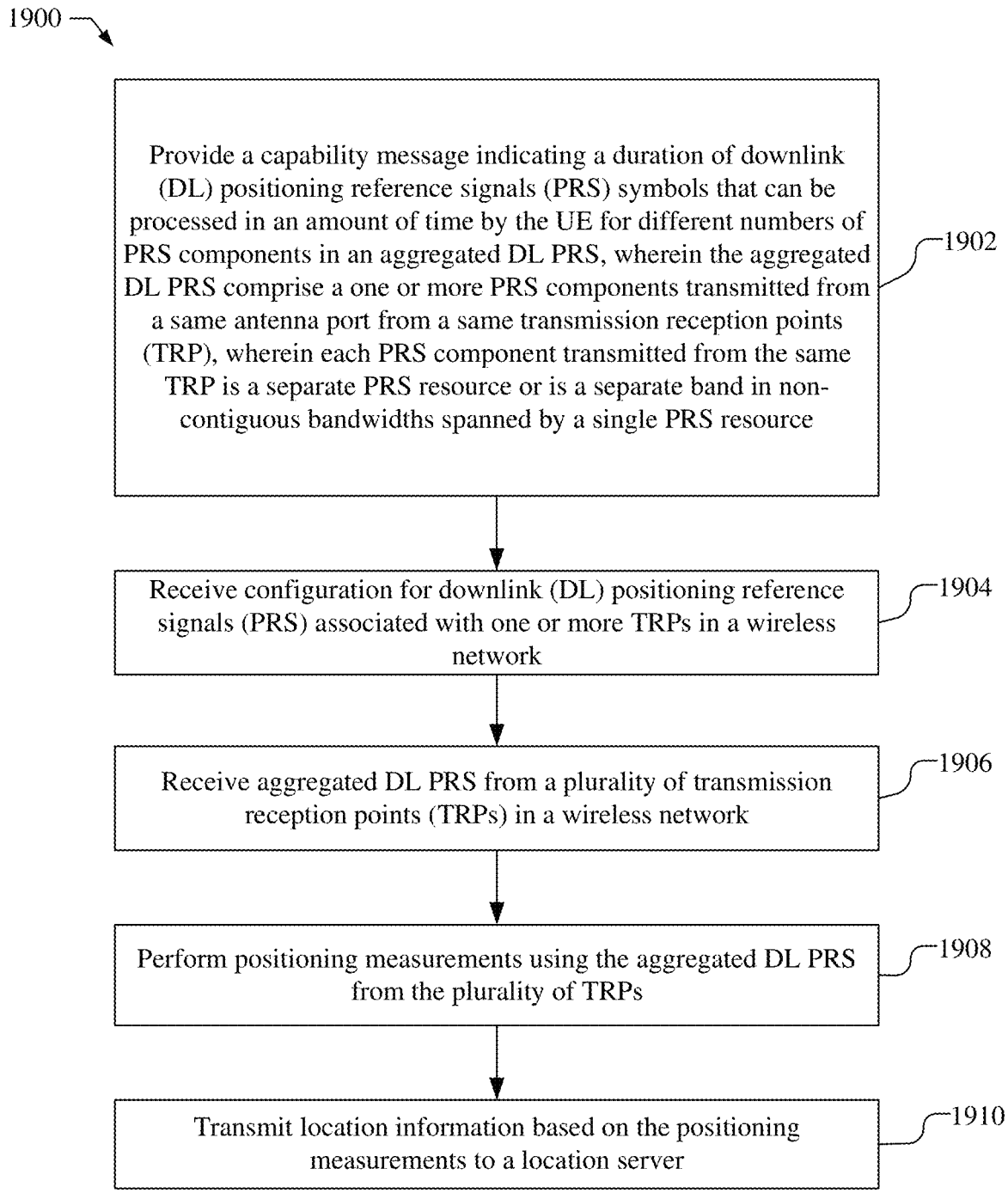
FIG. 19 shows a flowchart for another exemplary method for supporting positioning of a UE.

FIG. 19 shows a flowchart for an exemplary method 1900 for supporting positioning of a user equipment (UE) that is performed by the UE, in a manner consistent with disclosed implementation.

At block 1902, the UE may provide a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource, e.g., as discussed at stage 2 of FIG. 14. At block 1904, the UE may receive configurations for downlink (DL) positioning reference signals (PRS) associated with one or more TRPs in a wireless network, e.g., as discussed at stage 3 of FIG. 14. At block 1906, the UE may receive aggregated DL PRS from a plurality of transmission reception points (TRPs) in the wireless network, as discussed at stages 5a, 6a, and 7a of FIG. 14. At block 1908, the UE may perform positioning measurements using the aggregated DL PRS from the plurality of TRPs, e.g., as discussed at stage 8 of FIG. 14. At block 1910, the UE may transmit location information based on the positioning measurements to a location server, e.g., as discussed at stage 10 of FIG. 14.

Figure 20:
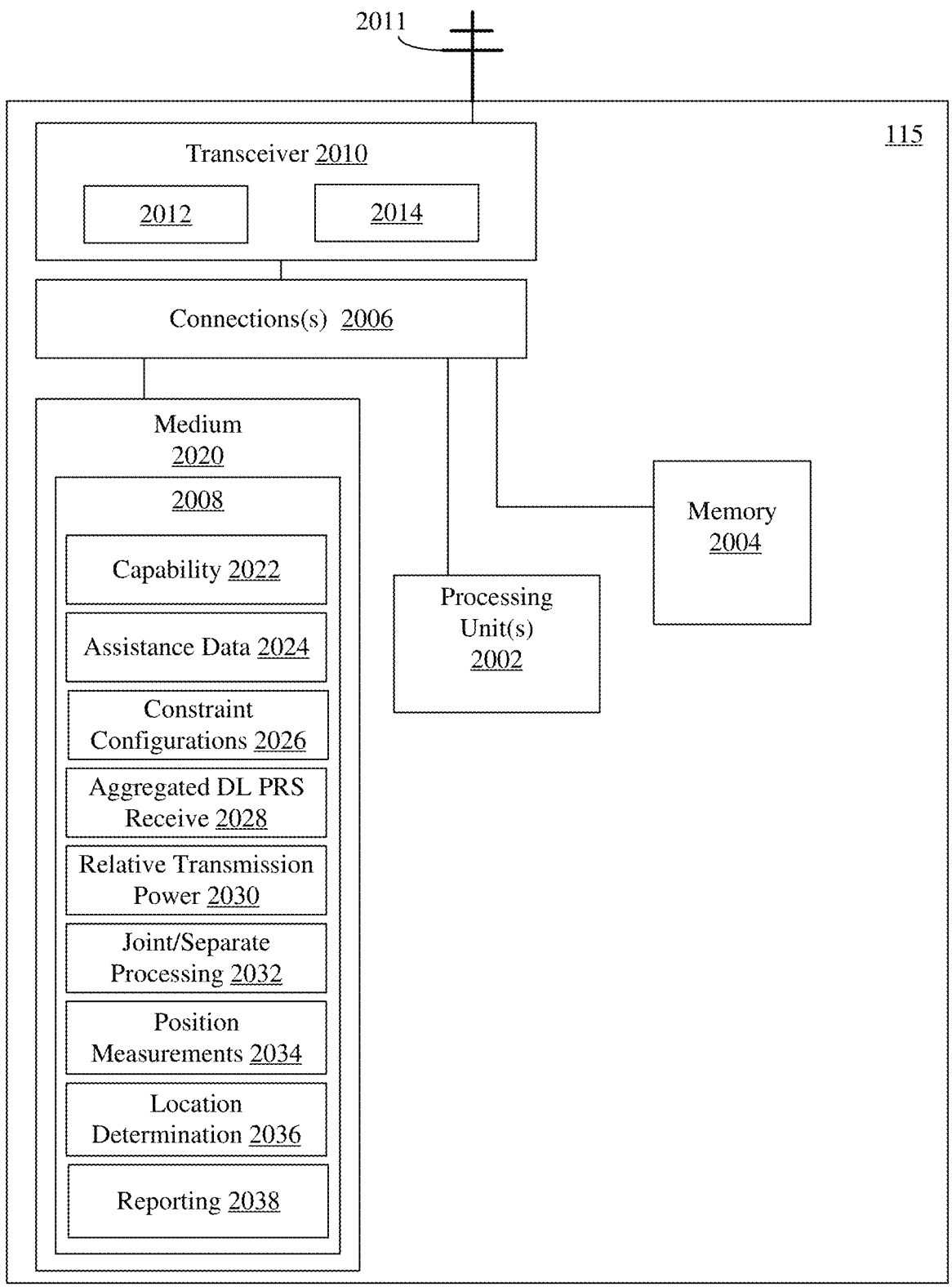
FIG. 20 illustrates a schematic block diagram showing certain exemplary features of a UE enabled to support positioning of the UE using aggregated DL PRS.

FIG. 20 shows a schematic block diagram illustrating certain exemplary features of a UE, e.g., UE 115, enabled to support positioning of the UE using aggregated DL or SL PRS, as described herein. UE 115 may, for example, include one or more processors 2002, memory 2004, an external interface such as a transceiver 2010 (e.g., wireless network interface), which may be operatively coupled with one or more connections 2006 (e.g., buses, lines, fibers, links, etc.) to non-transitory computer readable medium 2020 and memory 2004. The UE 115 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 115 may take the form of a chipset, and/or the like. Transceiver 2010 may, for example, include a transmitter 2012 enabled to transmit one or more signals over one or more types of wireless communication networks and a receiver 2014 to receive one or more signals transmitted over the one or more types of wireless communication networks.

In some embodiments, UE 115 may include antenna 2011, which may be internal or external. UE antenna 2011 may be used to transmit and/or receive signals processed by transceiver 2010. In some embodiments, UE antenna 2011 may be coupled to transceiver 2010. In some embodiments, measurements of signals received (transmitted) by UE 115 may be performed at the point of connection of the UE antenna 2011 and transceiver 2010. For example, the measurement point of reference for received (transmitted) RF signal measurements may be an input (output) terminal of the receiver 2014 (transmitter 2012) and an output (input) terminal of the UE antenna 2011. In a UE 115 with multiple UE antennas 2011 or antenna arrays, the antenna connector may be viewed as a virtual point representing the aggregate output (input) of multiple UE antennas. In some embodiments, UE 115 may measure received signals including signal strength and TOA measurements and the raw measurements may be processed by the one or more processors 2002.

The one or more processors 2002 may be implemented using a combination of hardware, firmware, and software. For example, the one or more processors 2002 may be configured to perform the functions discussed herein by implementing one or more instructions or program code 2008 on a non-transitory computer readable medium, such as medium 2020 and/or memory 2004. In some embodiments, the one or more processors 2002 may represent one or more circuits configurable to perform at least a portion of a data signal computing procedure or process related to the operation of UE 115.

The medium 2020 and/or memory 2004 may store instructions or program code 2008 that contain executable code or software instructions that when executed by the one or more processors 2002 cause the one or more processors 2002 to operate as a special purpose computer programmed to perform the techniques disclosed herein. As illustrated in UE 115, the medium 2020 and/or memory 2004 may include one or more components or modules that may be implemented by the one or more processors 2002 to perform the methodologies described herein. While the components or modules are illustrated as software in medium 2020 that is executable by the one or more processors 2002, it should be understood that the components or modules may be stored in memory 2004 or may be dedicated hardware either in the one or more processors 2002 or off the processors.

A number of software modules and data tables may reside in the medium 2020 and/or memory 2004 and be utilized by the one or more processors 2002 in order to manage both communications and the functionality described herein. It should be appreciated that the organization of the contents of the medium 2020 and/or memory 2004 as shown in UE 115 is merely exemplary, and as such the functionality of the modules and/or data structures may be combined, separated, and/or be structured in different ways depending upon the implementation of the UE 115.

The medium 2020 and/or memory 2004 may include a capability module 2022 that when implemented by the one or more processors 2002 configures the one or more processors 2002 to send a capability message, via transceiver 2010, e.g. to a location server. The capability message may indicate the UE's ability to receive and process aggregated DL PRS. The capability message my indicate a duration of DL PRS symbols that can be processed in an amount of time by the UE for different numbers of PRS components in an aggregated DL PRS, wherein the aggregated DL PRS comprise one or more PRS components transmitted from a same antenna port from a same transmission reception points (TRP).

The medium 2020 and/or memory 2004 may include an assistance data module 2024 that when implemented by the one or more processors 2002 configures the one or more processors 2002 to receive assistance data, e.g., including configured PRS constraints, e.g., for aggregated DL PRS transmissions from one or more TRPs and optionally locations of TRPs, e.g., via transceiver 2010.

The medium 2020 and/or memory 2004 may include a PRS constraint configurations module 2026 that when implemented by the one or more processors 2002 configures the one or more processors 2002 to receive the configured constraints for the aggregated DL PRS transmissions from one or more TRPs and to determine whether PRS components in an aggregated DL PRS are the same or similar to within a predetermined threshold that stored, e.g., in data tables that reside in the medium 2020 and/or memory 2004.

The medium 2020 and/or memory 2004 may include an aggregated DL PRS receive module 2028 that when implemented by the one or more processors 2002 configures the one or more processors 2002 to receive one or more aggregated DL PRS from one or more TRPs, via transceiver 2010, where each aggregated DL PRS includes one or more PRS components transmitted from a same TRP, and each PRS component transmitted from the same TRP comprises a separate PRS resource associated with a contiguous frequency-domain bandwidth or comprises a plurality of contiguous frequency-domain bandwidths spanned by a single PRS resource.

The medium 2020 and/or memory 2004 may include a relative transmission power module 2030 that when implemented by the one or more processors 2002 configures the one or more processors 2002 to receive an indication of relative transmission power between the PRS components of each aggregated DL PRS transmitted from the same TRP, via the transceiver 2010. The relative transmission power between the PRS components may be, e.g., a power offset from a reference DL reference signal, which may be, e.g., a PRS component, a PRS resource from the same TRP that is not part of the aggregated DL PRS, or a signal that is not a PRS. In another implementation, the relative transmission power between the PRS components may be, e.g., an indication of transmission power for each PRS component. The relative transmission power between the PRS components may be, e.g., Energy Per Resource Element (EPRE). In implementations, where there is no indication of relative transmission power between the PRS components, the relative transmission power module 2030 when implemented by the one or more processors 2002 may configure the one or more processors 2002 to determine that the PRS components are transmitted with the same power.

The medium 2020 and/or memory 2004 may include a joint/separate processing module 2032 that when implemented by the one or more processors 2002 configures the one or more processors 2002 to jointly process the PRS components in a received aggregated DL PRS or to separately process the PRS components in a received aggregated DL PRS. For example, where all of the PRS components are unpunctured and are aligned in time, and are configured with the same (or similar) constraints, the one or more processors 2002 are configured to jointly process the PRS components to effectively increase the PRS bandwidth. If a PRS component is punctured, e.g., has a different slot structure, collides with a synchronization signal block (SSB) in a frequency layer, or collides with uplink symbols in a frequency layer, or if the PRS component is configured with different constraints, the one or more processors 2002 may be configured to not process the PRS components jointly. For example, in such an occasion, the one or more processors 2002 may be configured to not process any of the PRS components, to not process the punctured PRS component but to process the remaining PRS components separately or to jointly process any remaining PRS components that are contiguous in frequency, or to process unpunctured physical resource blocks (PRBs) in all PRS components jointly.

The medium 2020 and/or memory 2004 may include a position measurements module 2034 that when implemented by the one or more processors 2002 configures the one or more processors 2002 to performing positioning measurements using the aggregated DL PRS from the plurality of TRPs. For example, the positioning measurements may be, e.g., TOA, RSTD, OTDOA, Rx-Tx, RSRP, or RTT if uplink reference signals are used.

The medium 2020 and/or memory 2004 may include a location determination module 2036 that when implemented by the one or more processors 2002 configures the one or more processors 2002 to estimate the location of the UE in a UE based positioning process using the position measurements and the locations of TRPs, e.g., received in assistance data.

The medium 2020 and/or memory 2004 may include a reporting module 2038 that when implemented by the one or more processors 2002 configures the one or more processors 2002 to transmit location information based on the positioning measurements to a location server, via the transceiver 2010. The location information, for example, may be the position measurements and/or the location estimate for the UE if determined.

The methodologies described herein may be implemented by various means depending upon the application. For example, these methodologies may be implemented in hardware, firmware, software, or any combination thereof. For a hardware implementation, the one or more processors 2002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 2020 or memory 2004 that is connected to and executed by the one or more processors 2002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 2008 on a non-transitory computer readable medium, such as medium 2020 and/or memory 2004. Examples include computer readable media encoded with a data structure and computer readable media encoded with a computer program 2008. For example, the non-transitory computer readable medium including program code 2008 stored thereon may include program code 2008 to support OTDOA measurements in a manner consistent with disclosed embodiments. Non-transitory computer readable medium 2020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 2008 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 2020, instructions and/or data may be provided as signals on transmission media included in a communication apparatus. For example, a communication apparatus may include a transceiver 2010 having signals indicative of instructions and data. The instructions and data are configured to cause one or more processors to implement the functions outlined in the claims. That is, the communication apparatus includes transmission media with signals indicative of information to perform disclosed functions.

Memory 2004 may represent any data storage mechanism. Memory 2004 may include, for example, a primary memory and/or a secondary memory. Primary memory may include, for example, a random access memory, read only memory, etc. While illustrated in this example as being separate from one or more processors 2002, it should be understood that all or part of a primary memory may be provided within or otherwise co-located/coupled with the one or more processors 2002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 2020. As such, in certain example implementations, the methods and/or apparatuses presented herein may take the form in whole or part of a computer readable medium 2020 that may include computer implementable code 2008 stored thereon, which if executed by one or more processors 2002 may be operatively enabled to perform all or portions of the example operations as described herein. Computer readable medium 2020 may be a part of memory 2004.

A wireless entity, such as UE 115, configured to support positioning of a user equipment (UE) may include a means for receiving configurations for positioning reference signals (PRS) associated with one or more second wireless entities, which may be, e.g., the wireless transceiver 2010 and one or more processors 2002 with dedicated hardware or implementing executable code or software instructions in medium 2020 and/or memory 2004, such as the assistance data module 2024 and PRS constraint configurations module 2026. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource may be, e.g., the wireless transceiver 2010 and one or more processors 2002 with dedicated hardware or implementing executable code or software instructions in medium 2020 and/or memory 2004, such as the aggregated DL PRS receive module 2028. A means for processing jointly unpunctured PRS components of the aggregated PRS that are aligned in the time domain assuming that the PRS components of the aggregated PRS are transmitted from a same antenna port may be, e.g., the one or more processors 2002 with dedicated hardware or implementing executable code or software instructions in medium 2020 and/or memory 2004, such as the joint/separate processing module 2032. A means for performing positioning measurements using the processed aggregated PRS from the one or more second wireless entities may be, e.g., the one or more processors 2002 with dedicated hardware or implementing executable code or software instructions in medium 2020 and/or memory 2004, such as the position measurements module 2034. A means for transmitting location information based on the positioning measurements may be, e.g., the wireless transceiver 2010 and one or more processors 2002 with dedicated hardware or implementing executable code or software instructions in medium 2020 and/or memory 2004, such as the reporting module 2038.

In one implementation, the wireless entity may include a means for leaving unprocessed all remaining PRS components of the at least one aggregated PRS on the one or more symbols, which may be, e.g., the one or more processors 2002 with dedicated hardware or implementing executable code or software instructions in medium 2020 and/or memory 2004, such as the joint/separate processing module 2032.

In one implementation, the wireless entity may include a means for leaving unprocessed the at least one PRS component that is punctured and processing remaining PRS components separately on the one or more symbols, which may be, e.g., the one or more processors 2002 with dedicated hardware or implementing executable code or software instructions in medium 2020 and/or memory 2004, such as the joint/separate processing module 2032. The means for processing the remaining PRS components separately on the one or more symbols includes means for processing the remaining PRS components assuming that the remaining PRS components are transmitted from a separate antenna port, which may be, e.g., the one or more processors 2002 with dedicated hardware or implementing executable code or software instructions in medium 2020 and/or memory 2004, such as the joint/separate processing module 2032. The means for processing the remaining PRS components separately on the one or more symbols includes means for processing the remaining PRS components with an accuracy requirement that corresponds to each of the remaining PRS components separately, which may be, e.g., the one or more processors 2002 with dedicated hardware or implementing executable code or software instructions in medium 2020 and/or memory 2004, such as the joint/separate processing module 2032.

In one implementation, the wireless entity may include a means for leaving unprocessed the at least one PRS component that is punctured and processing remaining contiguous PRS components jointly on the one or more symbols, which may be, e.g., the one or more processors 2002 with dedicated hardware or implementing executable code or software instructions in medium 2020 and/or memory 2004, such as the joint/separate processing module 2032.

In one implementation, the wireless entity may include a means for processing unpunctured physical resource blocks (PRBs) in all PRS components jointly on the one or more symbols, which may be, e.g., the one or more processors 2002 with dedicated hardware or implementing executable code or software instructions in medium 2020 and/or memory 2004, such as the joint/separate processing module 2032.

A wireless entity, such as UE 115, configured to support positioning of a user equipment (UE) may include a means for receiving configurations for positioning reference signals (PRS) associated with one or more second wireless entities, which may be, e.g., the wireless transceiver 2010 and one or more processors 2002 with dedicated hardware or implementing executable code or software instructions in medium 2020 and/or memory 2004, such as the assistance data module 2024 and PRS constraint configurations module 2026. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource may be, e.g., the wireless transceiver 2010 and one or more processors 2002 with dedicated hardware or implementing executable code or software instructions in medium 2020 and/or memory 2004, such as the aggregated DL PRS receive module 2028. A means for receiving an indication of relative transmission power between the PRS components of each aggregated PRS transmitted from the same second wireless entity may be, e.g., the wireless transceiver 2010 and one or more processors 2002 with dedicated hardware or implementing executable code or software instructions in medium 2020 and/or memory 2004, such as the relative transmission power module 2030. A means for processing jointly the one or more PRS components for each aggregated PRS at least based on the received indication of relative transmission power may be, e.g., the one or more processors 2002 with dedicated hardware or implementing executable code or software instructions in medium 2020 and/or memory 2004, such as the joint/separate processing module 2032. A means for performing positioning measurements using the processed aggregated PRS from the one or more second wireless entities may be, e.g., the one or more processors 2002 with dedicated hardware or implementing executable code or software instructions in medium 2020 and/or memory 2004, such as the position measurements module 2034. A means for transmitting location information based on the positioning measurements may be, e.g., the wireless transceiver 2010 and one or more processors 2002 with dedicated hardware or implementing executable code or software instructions in medium 2020 and/or memory 2004, such as the reporting module 2038.

A wireless entity, such as UE 115, configured to support positioning of a user equipment (UE) may include a means for receiving configurations for positioning reference signals (PRS) associated with one or more second wireless entities, which may be, e.g., the wireless transceiver 2010 and one or more processors 2002 with dedicated hardware or implementing executable code or software instructions in medium 2020 and/or memory 2004, such as the assistance data module 2024 and PRS constraint configurations module 2026. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof may be, e.g., the wireless transceiver 2010 and one or more processors 2002 with dedicated hardware or implementing executable code or software instructions in medium 2020 and/or memory 2004, such as the aggregated DL PRS receive module 2028. A means for processing jointly the one or more PRS components for each aggregated PRS when the PRS components are configured with the same constraints and separately processing the one or more PRS components for each aggregated PRS when the PRS components are not configured with the same constraints may be, e.g., the one or more processors 2002 with dedicated hardware or implementing executable code or software instructions in medium 2020 and/or memory 2004, such as the joint/separate processing module 2032. A means for performing positioning measurements using the processed aggregated PRS from the one or more second wireless entities may be, e.g., the one or more processors 2002 with dedicated hardware or implementing executable code or software instructions in medium 2020 and/or memory 2004, such as the position measurements module 2034. A means for transmitting location information based on the positioning measurements may be, e.g., the wireless transceiver 2010 and one or more processors 2002 with dedicated hardware or implementing executable code or software instructions in medium 2020 and/or memory 2004, such as the reporting module 2038.

A UE, such as UE 115, configured to support positioning of the UE may include a means for providing a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource, which may be, e.g., the wireless transceiver 2010 and one or more processors 2002 with dedicated hardware or implementing executable code or software instructions in medium 2020 and/or memory 2004, such as the capability module 2022. A means for receiving configurations for downlink (DL) positioning reference signals (PRS) associated with one or more TRPs in a wireless network may be, e.g., the wireless transceiver 2010 and one or more processors 2002 with dedicated hardware or implementing executable code or software instructions in medium 2020 and/or memory 2004, such as the assistance data module 2024 and PRS constraint configurations module 2026. A means for receiving aggregated DL PRS from a plurality of TRPs in the wireless network may be, e.g., the wireless transceiver 2010 and one or more processors 2002 with dedicated hardware or implementing executable code or software instructions in medium 2020 and/or memory 2004, such as the aggregated DL PRS receive module 2028. A means for performing positioning measurements using the aggregated DL PRS from the plurality of TRPs may be, e.g., the one or more processors 2002 with dedicated hardware or implementing executable code or software instructions in medium 2020 and/or memory 2004, such as the position measurements module 2034. A means for transmitting location information based on the positioning measurements may be, e.g., the wireless transceiver 2010 and one or more processors 2002 with dedicated hardware or implementing executable code or software instructions in medium 2020 and/or memory 2004, such as the reporting module 2038.

Figure 21:
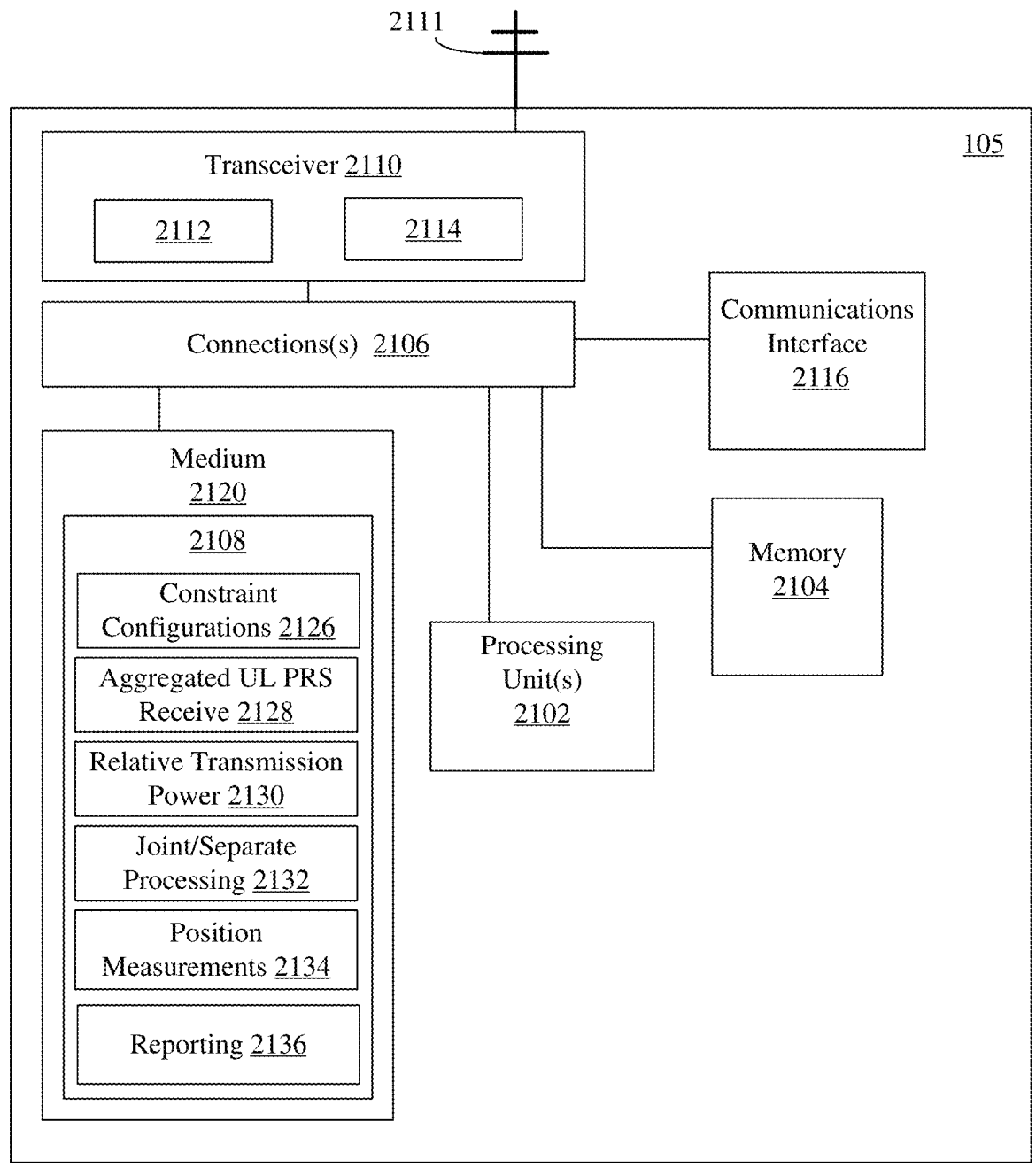
FIG. 21 illustrates a schematic block diagram showing certain exemplary features of a TRP enabled to support positioning of the UE using aggregated UL PRS.

FIG. 21 shows a schematic block diagram illustrating certain exemplary features of a TRP, e.g., TRP 105, enabled to support positioning of the UE using aggregated UL PRS, as described herein. TRP 105 may, for example, include one or more processors 2102, memory 2104, an external interface, which may include a transceiver 2110 (e.g., wireless network interface) and a communications interface 2116 (e.g., wireline or wireless network interface to other TRPs and/or the core network), which may be operatively coupled with one or more connections 2106 (e.g., buses, lines, fibers, links, etc.) to non-transitory computer readable medium 2120 and memory 2104. The TRP 105 may further include additional items, which are not shown, such as a user interface that may include e.g., a display, a keypad or other input device, such as virtual keypad on the display, through which a user may interface with the UE, or a satellite positioning system receiver. In certain example implementations, all or part of TRP 105 may take the form of a chipset, and/or the like. Transceiver 2110 may, for example, include a transmitter 2112 enabled to transmit one or more signals over one or more types of wireless communication networks and a receiver 2114 to receive one or more signals transmitted over the one or more types of wireless communication networks. The communications interface 2116 may be a wired or wireless interface capable of connecting to other TRPs in the RAN or network entities, such as a location server 196 shown in FIG. 1.

In some embodiments, TRP 105 may include antenna 2111, which may be internal or external. Antenna 2111 may be used to transmit and/or receive signals processed by transceiver 2110. In some embodiments, antenna 2111 may be coupled to transceiver 2110. In some embodiments, measurements of signals received (transmitted) by TRP 105 may be performed at the point of connection of the antenna 2111 and transceiver 2110. For example, the measurement point of reference for received (transmitted) RF signal measurements may be an input (output) terminal of the receiver 2114 (transmitter 2112) and an output (input) terminal of the antenna 2111. In a TRP 105 with multiple antennas 2111 or antenna arrays, the antenna connector may be viewed as a virtual point representing the aggregate output (input) of multiple antennas. In some embodiments, TRP 105 may measure received signals including signal strength and TOA measurements and the raw measurements may be processed by the one or more processors 2102.

The one or more processors 2102 may be implemented using a combination of hardware, firmware, and software. For example, the one or more processors 2102 may be configured to perform the functions discussed herein by implementing one or more instructions or program code 2108 on a non-transitory computer readable medium, such as medium 2120 and/or memory 2104. In some embodiments, the one or more processors 2102 may represent one or more circuits configurable to perform at least a portion of a data signal computing procedure or process related to the operation of TRP 105.

The medium 2120 and/or memory 2104 may store instructions or program code 2108 that contain executable code or software instructions that when executed by the one or more processors 2102 cause the one or more processors 2102 to operate as a special purpose computer programmed to perform the techniques disclosed herein. As illustrated in TRP 105, the medium 2120 and/or memory 2104 may include one or more components or modules that may be implemented by the one or more processors 2102 to perform the methodologies described herein. While the components or modules are illustrated as software in medium 2120 that is executable by the one or more processors 2102, it should be understood that the components or modules may be stored in memory 2104 or may be dedicated hardware either in the one or more processors 2102 or off the processors.

A number of software modules and data tables may reside in the medium 2120 and/or memory 2104 and be utilized by the one or more processors 2102 in order to manage both communications and the functionality described herein. It should be appreciated that the organization of the contents of the medium 2120 and/or memory 2104 as shown in TRP 105 is merely exemplary, and as such the functionality of the modules and/or data structures may be combined, separated, and/or be structured in different ways depending upon the implementation of the TRP 105.

The medium 2120 and/or memory 2104 may include a PRS constraint configurations module 2126 that when implemented by the one or more processors 2102 configures the one or more processors 2102 to receive the configured constraints for the aggregated UL PRS transmissions from a UE and to determine whether PRS components in an aggregated UL PRS are the same or similar to within a predetermined threshold that stored, e.g., in data tables that reside in the medium 2120 and/or memory 2104.

The medium 2120 and/or memory 2104 may include an aggregated UL PRS receive module 2128 that when implemented by the one or more processors 2102 configures the one or more processors 2102 to receive one or more aggregated UL PRS from a UE, via transceiver 2110, where each aggregated UE PRS includes one or more PRS components transmitted from a same UE, and each PRS component transmitted from the same UE comprises a separate PRS resource associated with a contiguous frequency-domain bandwidth or comprises a plurality of contiguous frequency-domain bandwidths spanned by a single PRS resource.

The medium 2120 and/or memory 2104 may include a relative transmission power module 2130 that when implemented by the one or more processors 2102 configures the one or more processors 2102 to receive an indication of relative transmission power between the PRS components of each aggregated UL PRS transmitted from the same UE, via the transceiver 2110. The relative transmission power between the PRS components may be, e.g., a power offset from a reference UL reference signal, which may be, e.g., a PRS component, a PRS resource from the same TRP that is not part of the aggregated UL PRS, or a signal that is not a PRS. In another implementation, the relative transmission power between the PRS components may be, e.g., an indication of transmission power for each PRS component. The relative transmission power between the PRS components may be, e.g., Energy Per Resource Element (EPRE). In implementations, where there is no indication of relative transmission power between the PRS components, the relative transmission power module 2130 when implemented by the one or more processors 2102 may configure the one or more processors 2102 to determine that the PRS components are transmitted with the same power.

The medium 2120 and/or memory 2104 may include a joint/separate processing module 2132 that when implemented by the one or more processors 2102 configures the one or more processors 2102 to jointly process the PRS components in a received aggregated UL PRS or to separately process the PRS components in a received aggregated UL PRS. For example, where all of the PRS components are unpunctured and are aligned in time, and are configured with the same (or similar) constraints, the one or more processors 2102 are configured to jointly process the PRS components to effectively increase the PRS bandwidth. If a PRS component is punctured, e.g., has a different slot structure, collides with a synchronization signal block (SSB) in a frequency layer, or collides with downlink symbols in a frequency layer, or if the PRS component is configured with different constraints, the one or more processors 2102 may be configured to not process the PRS components jointly. For example, in such an occasion, the one or more processors 2102 may be configured to not process any of the PRS components, to not process the punctured PRS component but to process the remaining PRS components separately or to jointly process any remaining PRS components that are contiguous in frequency, or to process unpunctured physical resource blocks (PRBs) in all PRS components jointly.

The medium 2120 and/or memory 2104 may include a position measurements module 2134 that when implemented by the one or more processors 2102 configures the one or more processors 2102 to performing positioning measurements using the aggregated UL PRS from the plurality of TRPs. For example, the positioning measurements may be, e.g., TOA, RSTD, OTDOA, Rx-Tx, RSRP, or RTT if downlink reference signals are used in addition to the UL PRS.

The medium 2120 and/or memory 2104 may include a reporting module 2136 that when implemented by the one or more processors 2102 configures the one or more processors 2102 to transmit location information based on the positioning measurements, e.g., to a location server, via the transceiver 2110. The location information, for example, may be the position measurements.

The methodologies described herein may be implemented by various means depending upon the application. For example, these methodologies may be implemented in hardware, firmware, software, or any combination thereof. For a hardware implementation, the one or more processors 2102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 2120 or memory 2104 that is connected to and executed by the one or more processors 2102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 2108 on a non-transitory computer readable medium, such as medium 2120 and/or memory 2104. Examples include computer readable media encoded with a data structure and computer readable media encoded with a computer program 2108. For example, the non-transitory computer readable medium including program code 2108 stored thereon may include program code 2108 to support OTDOA measurements in a manner consistent with disclosed embodiments. Non-transitory computer readable medium 2120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 2108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 2120, instructions and/or data may be provided as signals on transmission media included in a communication apparatus. For example, a communication apparatus may include a transceiver 2110 having signals indicative of instructions and data. The instructions and data are configured to cause one or more processors to implement the functions outlined in the claims. That is, the communication apparatus includes transmission media with signals indicative of information to perform disclosed functions.

Memory 2104 may represent any data storage mechanism. Memory 2104 may include, for example, a primary memory and/or a secondary memory. Primary memory may include, for example, a random access memory, read only memory, etc. While illustrated in this example as being separate from one or more processors 2102, it should be understood that all or part of a primary memory may be provided within or otherwise co-located/coupled with the one or more processors 2102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 2120. As such, in certain example implementations, the methods and/or apparatuses presented herein may take the form in whole or part of a computer readable medium 2120 that may include computer implementable code 2108 stored thereon, which if executed by one or more processors 2102 may be operatively enabled to perform all or portions of the example operations as described herein. Computer readable medium 2120 may be a part of memory 2104.

A wireless entity, such as TRP 105, configured to support positioning of a user equipment (UE) may include a means for receiving configurations for positioning reference signals (PRS) associated with one or more second wireless entities, which may be, e.g., the communications interface 2116 or wireless transceiver 2110 and one or more processors 2102 with dedicated hardware or implementing executable code or software instructions in medium 2120 and/or memory 2104, such as the PRS constraint configurations module 2126. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource may be, e.g., the wireless transceiver 2110 and one or more processors 2102 with dedicated hardware or implementing executable code or software instructions in medium 2120 and/or memory 2104, such as the aggregated DL PRS receive module 2128. A means for processing jointly unpunctured PRS components of the aggregated PRS that are aligned in the time domain may be, e.g., the one or more processors 2102 with dedicated hardware or implementing executable code or software instructions in medium 2120 and/or memory 2104, such as the joint/separate processing module 2132. A means for performing positioning measurements using the processed aggregated PRS from the one or more second wireless entities may be, e.g., the one or more processors 2102 with dedicated hardware or implementing executable code or software instructions in medium 2120 and/or memory 2104, such as the position measurements module 2134. A means for transmitting location information based on the positioning measurements may be, e.g., the wireless transceiver 2110 and one or more processors 2102 with dedicated hardware or implementing executable code or software instructions in medium 2120 and/or memory 2104, such as the reporting module 2136.

In one implementation, the wireless entity may include a means for leaving unprocessed all remaining PRS components of the at least one aggregated PRS on the one or more symbols, which may be, e.g., the one or more processors 2102 with dedicated hardware or implementing executable code or software instructions in medium 2120 and/or memory 2104, such as the joint/separate processing module 2132.

In one implementation, the wireless entity may include a means for leaving unprocessed the at least one PRS component that is punctured and processing remaining PRS components separately on the one or more symbols, which may be, e.g., the one or more processors 2102 with dedicated hardware or implementing executable code or software instructions in medium 2120 and/or memory 2104, such as the joint/separate processing module 2132. The means for processing the remaining PRS components separately on the one or more symbols includes means for processing the remaining PRS components assuming that the remaining PRS components are transmitted from a separate antenna port, which may be, e.g., the one or more processors 2102 with dedicated hardware or implementing executable code or software instructions in medium 2120 and/or memory 2104, such as the joint/separate processing module 2132. The means for processing the remaining PRS components separately on the one or more symbols includes means for processing the remaining PRS components with an accuracy requirement that corresponds to each of the remaining PRS components separately, which may be, e.g., the one or more processors 2102 with dedicated hardware or implementing executable code or software instructions in medium 2120 and/or memory 2104, such as the joint/separate processing module 2132.

In one implementation, the wireless entity may include a means for leaving unprocessed the at least one PRS component that is punctured and processing remaining contiguous PRS components jointly on the one or more symbols, which may be, e.g., the one or more processors 2102 with dedicated hardware or implementing executable code or software instructions in medium 2120 and/or memory 2104, such as the joint/separate processing module 2132.

In one implementation, the wireless entity may include a means for processing unpunctured physical resource blocks (PRBs) in all PRS components jointly on the one or more symbols, which may be, e.g., the one or more processors 2102 with dedicated hardware or implementing executable code or software instructions in medium 2120 and/or memory 2104, such as the joint/separate processing module 2132.

A wireless entity, such as TRP 105, configured to support positioning of a user equipment (UE) may include a means for receiving configurations for positioning reference signals (PRS) associated with one or more second wireless entities, which may be, e.g., the communications interface 2116 or wireless transceiver 2110 and one or more processors 2102 with dedicated hardware or implementing executable code or software instructions in medium 2120 and/or memory 2104, such as the PRS constraint configurations module 2126. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource may be, e.g., the wireless transceiver 2110 and one or more processors 2102 with dedicated hardware or implementing executable code or software instructions in medium 2120 and/or memory 2104, such as the aggregated DL PRS receive module 2128. A means for receiving an indication of relative transmission power between the PRS components of each aggregated PRS transmitted from the same second wireless entity may be, e.g., the wireless transceiver 2110 and one or more processors 2102 with dedicated hardware or implementing executable code or software instructions in medium 2120 and/or memory 2104, such as the relative transmission power module 2130. A means for processing jointly the one or more PRS components for each aggregated PRS at least based on the received indication of relative transmission power may be, e.g., the one or more processors 2102 with dedicated hardware or implementing executable code or software instructions in medium 2120 and/or memory 2104, such as the joint/separate processing module 2132. A means for performing positioning measurements using the processed aggregated PRS from the one or more second wireless entities may be, e.g., the one or more processors 2102 with dedicated hardware or implementing executable code or software instructions in medium 2120 and/or memory 2104, such as the position measurements module 2134. A means for transmitting location information based on the positioning measurements may be, e.g., the wireless transceiver 2110 and one or more processors 2102 with dedicated hardware or implementing executable code or software instructions in medium 2120 and/or memory 2104, such as the reporting module 2136.

A wireless entity, such as TRP 105, configured to support positioning of a user equipment (UE) may include a means for receiving configurations for positioning reference signals (PRS) associated with one or more second wireless entities, which may be, e.g., the communications interface 2116 or wireless transceiver 2110 and one or more processors 2102 with dedicated hardware or implementing executable code or software instructions in medium 2120 and/or memory 2104, such as the PRS constraint configurations module 2126. A means for receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of contiguous frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof may be, e.g., the wireless transceiver 2110 and one or more processors 2102 with dedicated hardware or implementing executable code or software instructions in medium 2120 and/or memory 2104, such as the aggregated DL PRS receive module 2128. A means for processing jointly the one or more PRS components for each aggregated PRS when the PRS components are configured with the same constraints and separately processing the one or more PRS components for each aggregated PRS when the PRS components are not configured with the same constraints may be, e.g., the one or more processors 2102 with dedicated hardware or implementing executable code or software instructions in medium 2120 and/or memory 2104, such as the joint/separate processing module 2132. A means for performing positioning measurements using the processed aggregated PRS from the one or more second wireless entities may be, e.g., the one or more processors 2102 with dedicated hardware or implementing executable code or software instructions in medium 2120 and/or memory 2104, such as the position measurements module 2134. A means for transmitting location information based on the positioning measurements may be, e.g., the wireless transceiver 2110 and one or more processors 2102 with dedicated hardware or implementing executable code or software instructions in medium 2120 and/or memory 2104, such as the reporting module 2136.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting positioning of a user equipment (UE) in a wireless network performed by a first wireless entity, comprising:

receiving configurations for positioning reference signals (PRS) associated with one or more second wireless entities;

receiving one or more aggregated PRS from the one or more second wireless entities, wherein each aggregated PRS comprises one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;

processing jointly unpunctured PRS components of the aggregated PRS that are aligned in time domain;

performing positioning measurements using the processed aggregated PRS from the one or more second wireless entities; and transmitting location information based on the positioning measurements.

2. The method of clause 1, wherein the configurations for the PRS associated with the one or more second wireless entities are received from a location server.

3. The method of either of clauses 1 or 2, wherein the first wireless entity is the UE and the one or more second wireless entities comprise transmission reception points (TRPs) in a network entity and the one or more aggregated PRS comprise downlink (DL) aggregated PRS.

4. The method of either of clauses 1 or 2, wherein the first wireless entity is the UE and the one or more second wireless entities comprise a second UE and the one or more aggregated PRS comprise sidelink (SL) aggregated PRS.

5. The method of either of clauses 1 or 2, wherein the first wireless entity is a transmission reception point (TRP) and the one or more second wireless entities comprise the UE and the one or more aggregated PRS comprise uplink (UL) aggregated PRS.

6. The method of any of clauses 1-5, wherein the plurality of frequency-domain bandwidths spanned by the single PRS resource are contiguous frequency-domain bandwidths.

7. The method of any of clauses 1-6, wherein the location information comprises the positioning measurements or a position estimation for the first wireless entity determined using the positioning measurements.

8. The method of any of clauses 1-7, wherein each PRS component from the same second wireless entity is transmitted on one or more different component carriers, bands, frequency layers, or bandwidths in a same band.

9. The method of any of clauses 1-8, wherein at least one PRS component of at least one aggregated PRS is punctured or is not aligned with other PRS components in the time domain so that the PRS in the at least one PRS component is dropped in one or more symbols.

10. The method of clause 9, wherein the at least one PRS component is punctured by one or more of having a different slot structure, collision with a synchronization signal block (SSB), collision with uplink symbols, collision with downlink symbols, or a combination thereof.

11. The method of clause 9, the method further comprising leaving unprocessed all remaining PRS components of the at least one aggregated PRS on the one or more symbols.

12. The method of clause 9, the method further comprising leaving unprocessed the at least one PRS component that is punctured and processing remaining PRS components separately on the one or more symbols.

13. The method of clause 12, wherein processing the remaining PRS components separately on the one or more symbols comprises processing jointly the remaining PRS components assuming that the remaining PRS components are transmitted from a separate antenna port.

14. The method of clause 12, wherein processing the remaining PRS components separately on the one or more symbols comprises processing the remaining PRS components with an accuracy requirement that corresponds to each of the remaining PRS components separately.

15. The method of clause 9, the method further comprising leaving unprocessed the at least one PRS component that is punctured and processing remaining contiguous PRS components jointly on the one or more symbols.

16. The method of clause 9, the method further comprising processing unpunctured physical resource blocks (PRBs) in all PRS components jointly on the one or more symbols.

17. A first wireless entity configured to support positioning of a user equipment (UE) in a wireless network, comprising:

an external interface comprising at least one wireless transceiver configured to wirelessly communicate with entities in the wireless network;

at least one memory; and at least one processor coupled to the at least one wireless transceiver and the at least one memory and configured to:

receive configurations, via the at least one wireless transceiver, for positioning reference signals (PRS) associated with one or more second wireless entities;

receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;

process jointly unpunctured PRS components of the aggregated PRS that are aligned in time domain;

perform positioning measurements using the processed aggregated PRS from the one or more second wireless entities; and transmit, via the at least one wireless transceiver, location information based on the positioning measurements.

18. The first wireless entity of clause 17, wherein the configurations for the PRS associated with the one or more second wireless entities are received from a location server.

19. The first wireless entity of either of clauses 17 or 18, wherein the first wireless entity is the UE and the one or more second wireless entities comprise transmission reception points (TRPs) in a network entity and the one or more aggregated PRS comprise downlink (DL) aggregated PRS.

20. The first wireless entity of either of clauses 17 or 18, wherein the first wireless entity is the UE and the one or more second wireless entities comprise a second UE and the one or more aggregated PRS comprise sidelink (SL) aggregated PRS.

21. The first wireless entity of either of clauses 17 or 18, wherein the first wireless entity is a transmission reception point (TRP) and the one or more second wireless entities comprise the UE and the one or more aggregated PRS comprise uplink (UL) aggregated PRS.

22. The first wireless entity of any of clauses 17-21, wherein the plurality of frequency-domain bandwidths spanned by the single PRS resource are contiguous frequency-domain bandwidths.

23. The first wireless entity of any of clauses 17-22, wherein the location information comprises the positioning measurements or a position estimation for the first wireless entity determined using the positioning measurements.

24. The first wireless entity of any of clauses 17-23, wherein each PRS component from the same second wireless entity is transmitted on one or more different component carriers, bands, frequency layers, or bandwidths in a same band.

25. The first wireless entity of any of clauses 17-24, wherein at least one PRS component of at least one aggregated PRS is punctured or is not aligned with other PRS components in the time domain so that the PRS in the at least one PRS component is dropped in one or more symbols.

26. The first wireless entity of clause 25, wherein the at least one PRS component is punctured by one or more of having a different slot structure, collision with a synchronization signal block (SSB), collision with uplink symbols, collision with downlink symbols, or a combination thereof.

27. The first wireless entity of clause 25, wherein the at least one processor is further configured to leave unprocessed all remaining PRS components of the at least one aggregated PRS on the one or more symbols.

28. The first wireless entity of clause 25, wherein the at least one processor is further configured to leave unprocessed the at least one PRS component that is punctured and processing remaining PRS components separately on the one or more symbols.

29. The first wireless entity of clause 28, wherein the at least one processor is configured to process the remaining PRS components separately on the one or more symbols by being configured to process jointly the remaining PRS components assuming that the remaining PRS components are transmitted from a separate antenna port.

30. The first wireless entity of clause 28, wherein the at least one processor is configured to process the remaining PRS components separately on the one or more symbols by being configured to process the remaining PRS components with an accuracy requirement that corresponds to each of the remaining PRS components separately.

31. The first wireless entity of clause 25, wherein the at least one processor is further configured to leave unprocessed the at least one PRS component that is punctured and processing remaining contiguous PRS components jointly on the one or more symbols.

32. The first wireless entity of clause 25, wherein the at least one processor is further configured to process unpunctured physical resource blocks (PRBs) in all PRS components jointly on the one or more symbols.

33. A method for supporting positioning of a user equipment (UE) in a wireless network performed by a first wireless entity, comprising:
receiving configurations for positioning reference signals (PRS) associated with one or more second wireless entities;
receiving one or more aggregated PRS from the one or more second wireless entities, wherein each aggregated PRS comprise a one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
receiving an indication of relative transmission power between the PRS components of each aggregated PRS transmitted from the same second wireless entity;
processing jointly the one or more PRS components for each aggregated PRS at least based on the received indication of relative transmission power;
performing positioning measurements using the processed aggregated PRS from the one or more second wireless entities; and
transmitting location information based on the positioning measurements.

34. The method of clause 33, wherein the configurations for the PRS associated with the one or more second wireless entities are received from a location server.

35. The method of either of clauses 33 or 34, wherein the first wireless entity is the UE and the one or more second wireless entities comprise transmission reception points (TRPs) in a network entity and the one or more aggregated PRS comprise downlink (DL) aggregated PRS.

36. The method of either of clauses 33 or 34, wherein the first wireless entity is the UE and the one or more second wireless entities comprise a second UE and the one or more aggregated PRS comprise sidelink (SL) aggregated PRS.

37. The method of either of clauses 33 or 34, wherein the first wireless entity is a transmission reception point (TRP) and the one or more second wireless entities comprise the UE and the one or more aggregated PRS comprise uplink (UL) aggregated PRS.

38. The method of any of clauses 33-37, wherein the plurality of frequency-domain bandwidths spanned by the single PRS resource are contiguous frequency-domain bandwidths.

39. The method of any of clauses 33-38, wherein the indication of relative transmission power between the PRS components of each aggregated PRS transmitted from the same second wireless entity comprises a power offset relative to a reference signal (RS).

40. The method of clause 39, wherein the RS comprises a PRS component, a PRS resource from the same second wireless entity that is not part of the aggregated PRS, or a signal that is not a PRS.

41. The method of clause 39, wherein the power offset is an offset of Energy Per Resource Element (EPRE) relative to the RS.

42. The method of any of clauses 33-38, wherein the indication of relative transmission power between the PRS components of each aggregated PRS transmitted from the same second wireless entity comprises a first power offset for a first PRS component relative to a second PRS component and a second power offset for a third PRS component relative to a fourth PRS component.

43. The method of any of clauses 33-38, wherein the indication of relative transmission power between the PRS components of each aggregated PRS transmitted from the same second wireless entity comprises an indication of transmission power for each PRS component.

44. The method of any of clauses 33-43, wherein each PRS component of each aggregated PRS transmitted from the same second wireless entity is transmitted on one or more different component carriers, bands, frequency layers, or bandwidths in a same band.

45. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the external interface and the at least one memory and configured to:
receive, via the external interface, configurations for positioning reference signals (PRS) associated with one or more second wireless entities;
receive, via the external interface, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;

receive, via the external interface, an indication of relative transmission power between the PRS components of each aggregated PRS transmitted from the same second wireless entity;

process jointly the one or more PRS components for each aggregated PRS at least based on the received indication of relative transmission power;

perform positioning measurements using the processed aggregated PRS from the one or more second wireless entities; and transmit, via the external interface, location information based on the positioning measurements.

46. The first wireless entity of clause 45, wherein the configurations for the PRS associated with the one or more second wireless entities are received from a location server.

47. The first wireless entity of either of clauses 45 or 46, wherein the first wireless entity is the UE and the one or more second wireless entities comprise transmission reception points (TRPs) in a network entity and the one or more aggregated PRS comprise downlink (DL) aggregated PRS.

48. The first wireless entity of either of clauses 45 or 46, wherein the first wireless entity is the UE and the one or more second wireless entities comprise a second UE and the one or more aggregated PRS comprise sidelink (SL) aggregated PRS.

49. The first wireless entity of either of clauses 45 or 46, wherein the first wireless entity is a transmission reception point (TRP) and the one or more second wireless entities comprise the UE and the one or more aggregated PRS comprise uplink (UL) aggregated PRS.

50. The first wireless entity of any of clauses 45-49, wherein the plurality of frequency-domain bandwidths spanned by the single PRS resource are contiguous frequency-domain bandwidths.

51. The first wireless entity of any of clauses 45-50, wherein the indication of relative transmission power between the PRS components of each aggregated PRS transmitted from the same second wireless entity comprises a power offset relative to a reference signal (RS).

52. The first wireless entity of clause 51, wherein the RS comprises a PRS component, a PRS resource from the same second wireless entity that is not part of the aggregated PRS, or a signal that is not a PRS.

53. The first wireless entity of clause 51, wherein the power offset is an offset of Energy Per Resource Element (EPRE) relative to the RS.

54. The first wireless entity of any of clauses 45-50, wherein the indication of relative transmission power between the PRS components of each aggregated PRS transmitted from the same second wireless entity comprises a first power offset for a first PRS component relative to a second PRS component and a second power offset for a third PRS component relative to a fourth PRS component.

55. The first wireless entity of any of clauses 45-50, wherein the indication of relative transmission power between the PRS components of each aggregated PRS transmitted from the same second wireless entity comprises an indication of transmission power for each PRS component.

56. The first wireless entity of any of clauses 45-55, wherein each PRS component of each aggregated PRS transmitted from the same second wireless entity is transmitted on one or more different component carriers, bands, frequency layers, or bandwidths in a same band.

57. A method for supporting positioning of a user equipment (UE) in a wireless network performed by a first wireless entity, comprising:

receiving configurations for positioning reference signals (PRS) associated with one or more second wireless entities;

receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof;

processing jointly the one or more PRS components for each aggregated PRS when the PRS components are configured with the same constraints and separately processing the one or more PRS components for each aggregated PRS when the PRS components are not configured with the same constraints;

performing positioning measurements using the processed one or more aggregated PRS from the one or more second wireless entities; and transmitting location information based on the positioning measurements.

58. The method of clause 57, wherein the configurations for the PRS associated with the one or more second wireless entities are received from a location server.

59. The method of either of clauses 57 or 58, wherein the first wireless entity is the UE and the one or more second wireless entities comprise transmission reception points (TRPs) in a network entity and the one or more aggregated PRS comprise downlink (DL) aggregated PRS.

60. The method of either of clauses 57 or 58, wherein the first wireless entity is the UE and the one or more second wireless entities comprise a second UE and the one or more aggregated PRS comprise sidelink (SL) aggregated PRS.

61. The method of either of clauses 57 or 58, wherein the first wireless entity is a transmission reception point (TRP) and the one or more second wireless entities comprise the UE and the one or more aggregated PRS comprise uplink (UL) aggregated PRS.

62. The method of any of clauses 57-61, wherein the plurality of frequency-domain bandwidths spanned by the single PRS resource are contiguous frequency-domain bandwidths.

63. The method of any of clauses 57-62, wherein the predefined number of symbols is 0 so that the PRS components are transmitted simultaneously.

64. The method of any of clauses 57-63, wherein each PRS component from the same TRP is transmitted on one or more different component carriers, bands, frequency layers, or bandwidths in a same band.

65. A first wireless entity configured to support positioning of a user equipment (UE) in a wireless network, comprising:

an external interface comprising at least one wireless transceiver configured to wirelessly communicate with entities in the wireless network;

at least one memory; and at least one processor coupled to the external interface and the at least one memory and configured to:

receive, via the external interface, configurations for positioning reference signals (PRS) associated with one or more second wireless entities;

receive, via the external interface, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof;

process jointly the one or more PRS components for each aggregated PRS when the PRS components are configured with the same constraints and separately processing the one or more PRS components for each aggregated PRS when the PRS components are not configured with the same constraints;

perform positioning measurements using the processed one or more aggregated PRS from the one or more second wireless entities; and transmit, via the external interface, location information based on the positioning measurements.

66. The first wireless entity of clause 65, wherein the configurations for the PRS associated with the one or more second wireless entities are received from a location server.

67. The first wireless entity of either of clauses 65 or 66, wherein the first wireless entity is the UE and the one or more second wireless entities comprise transmission reception points (TRPs) in a network entity and the one or more aggregated PRS comprise downlink (DL) aggregated PRS.

68. The first wireless entity of either of clauses 65 or 66, wherein the first wireless entity is the UE and the one or more second wireless entities comprise a second UE and the one or more aggregated PRS comprise sidelink (SL) aggregated PRS.

69. The first wireless entity of either of clauses 65 or 66, wherein the first wireless entity is a transmission reception point (TRP) and the one or more second wireless entities comprise the UE and the one or more aggregated PRS comprise uplink (UL) aggregated PRS.

70. The first wireless entity of any of clauses 65-69, wherein the plurality of frequency-domain bandwidths spanned by the single PRS resource are contiguous frequency-domain bandwidths.

71. The first wireless entity of any of clauses 65-70, wherein the predefined number of symbols is 0 so that the PRS components are transmitted simultaneously.

72. The first wireless entity of any of clauses 65-71, wherein each PRS component from the same TRP is transmitted on one or more different component carriers, bands, frequency layers, or bandwidths in a same band.

73. A method for supporting positioning of a user equipment (UE) in a wireless network performed by the UE, comprising:

providing a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource;

receiving configurations for downlink (DL) positioning reference signals (PRS) associated with one or more TRPs in the wireless network;

receiving aggregated DL PRS from a plurality of TRPs in the wireless network;

performing positioning measurements using the aggregated DL PRS from the plurality of TRPs; and transmitting location information based on the positioning measurements to a location server.

74. A user equipment (UE) in a wireless network configured to support positioning of the UE, comprising:

at least one wireless transceiver configured to wirelessly communicate with entities in the wireless network;

at least one memory; and at least one processor coupled to the at least one wireless transceiver and the at least one memory and configured to:

provide, via the at least one wireless transceiver, a capability message indicating a duration of downlink (DL) positioning reference signals (PRS) symbols that can be processed in an amount of time by the UE for different numbers of PRS components in an aggregated DL PRS, wherein the aggregated DL PRS comprise one or more PRS components transmitted from a same antenna port from a same transmission reception points (TRP), wherein each PRS component transmitted from the same TRP is a separate PRS resource or is a separate band in non-contiguous bandwidths spanned by a single PRS resource;

receive, via the at least one wireless transceiver, configurations for downlink (DL) positioning reference signals (PRS) associated with one or more TRPs in the wireless network;

receive, via the at least one wireless transceiver, aggregated DL PRS from a plurality of TRPs in the wireless network;

perform positioning measurements using the aggregated DL PRS from the plurality of TRPs; and transmit, via the at least one wireless transceiver, location information based on the positioning measurements to a location server.

Therefore, it is intended that claimed subject matter not be limited to the particular examples disclosed, but that such claimed subject matter may also include all aspects falling within the scope of appended claims, and equivalents thereof.

What is claimed is:

1. A method for supporting positioning of a user equipment (UE) in a wireless network performed by a first wireless entity, comprising:
    receiving configurations for positioning reference signals (PRS) associated with one or more second wireless entities;
    receiving one or more aggregated PRS from the one or more second wireless entities, wherein each aggregated PRS comprises one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein at least one PRS component of at least one aggregated PRS is punctured or is not aligned with other PRS components in the time domain and remaining PRS components in the one or more PRS components are unpunctured PRS components;
    processing jointly the unpunctured PRS components of the aggregated PRS that are aligned in time domain;
    performing positioning measurements using the processed aggregated PRS from the one or more second wireless entities; and
    transmitting location information based on the positioning measurements.

2. The method of claim 1, wherein the first wireless entity is the UE and the one or more second wireless entities comprise transmission reception points (TRPs) in a network entity and the one or more aggregated PRS comprise downlink (DL) aggregated PRS.

3. The method of claim 1, wherein the configurations for the PRS associated with the one or more second wireless entities are received from a location server.

4. The method of claim 1, wherein the plurality of frequency-domain bandwidths spanned by the single PRS resource are contiguous frequency-domain bandwidths.

5. The method of claim 1, wherein the location information comprises the positioning measurements or a position estimation for the first wireless entity determined using the positioning measurements.

6. The method of claim 1, wherein each PRS component from the same second wireless entity is transmitted on one or more different component carriers, bands, frequency layers, or bandwidths in a same band.

7. A method for supporting positioning of a user equipment (UE) in a wireless network performed by a first wireless entity, comprising:
    receiving configurations for positioning reference signals (PRS) associated with one or more second wireless entities;
    receiving one or more aggregated PRS from the one or more second wireless entities, wherein each aggregated PRS comprises one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
    processing jointly unpunctured PRS components of the aggregated PRS that are aligned in time domain;
    performing positioning measurements using the processed aggregated PRS from the one or more second wireless entities; and
    transmitting location information based on the positioning measurements;
    wherein the first wireless entity is the UE and the one or more second wireless entities comprise a second UE and the one or more aggregated PRS comprise sidelink (SL) aggregated PRS.

8. A method for supporting positioning of a user equipment (UE) in a wireless network performed by a first wireless entity, comprising:
    receiving configurations for positioning reference signals (PRS) associated with one or more second wireless entities;
    receiving one or more aggregated PRS from the one or more second wireless entities, wherein each aggregated PRS comprises one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
    processing jointly unpunctured PRS components of the aggregated PRS that are aligned in time domain;
    performing positioning measurements using the processed aggregated PRS from the one or more second wireless entities; and
    transmitting location information based on the positioning measurements;
    wherein the first wireless entity is a transmission reception point (TRP) and the one or more second wireless entities comprise the UE and the one or more aggregated PRS comprise uplink (UL) aggregated PRS.

9. A method for supporting positioning of a user equipment (UE) in a wireless network performed by a first wireless entity, comprising:
    receiving configurations for positioning reference signals (PRS) associated with one or more second wireless entities;
    receiving one or more aggregated PRS from the one or more second wireless entities, wherein each aggregated PRS comprises one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
    processing jointly unpunctured PRS components of the aggregated PRS that are aligned in time domain;
    performing positioning measurements using the processed aggregated PRS from the one or more second wireless entities; and
    transmitting location information based on the positioning measurements;
    wherein at least one PRS component of at least one aggregated PRS is punctured or is not aligned with other PRS components in the time domain so that the PRS in the at least one PRS component is dropped in one or more symbols.

10. The method of claim 9, wherein the at least one PRS component is punctured by one or more of having a different slot structure, collision with a synchronization signal block (SSB), collision with uplink symbols, collision with downlink symbols, or a combination thereof.

11. The method of claim 9, the method further comprising leaving unprocessed all remaining PRS components of the at least one aggregated PRS on the one or more symbols.

12. The method of claim 9, the method further comprising leaving unprocessed the at least one PRS component that is punctured and processing remaining PRS components separately on the one or more symbols.

13. The method of claim 12, wherein processing the remaining PRS components separately on the one or more symbols comprises processing jointly the remaining PRS components.

14. The method of claim 12, wherein processing the remaining PRS components separately on the one or more symbols comprises processing the remaining PRS components with an accuracy requirement that corresponds to each of the remaining PRS components separately.

15. The method of claim 9, the method further comprising leaving unprocessed the at least one PRS component that is punctured and processing remaining contiguous PRS components jointly on the one or more symbols.

16. The method of claim 9, the method further comprising processing unpunctured physical resource blocks (PRBs) in all PRS components jointly on the one or more symbols.

17. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the at least one wireless transceiver and the at least one memory and configured to:
receive configurations, via the at least one wireless transceiver, for positioning reference signals (PRS) associated with one or more second wireless entities;
receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein at least one PRS component of at least one aggregated PRS is punctured or is not aligned with other PRS components in the time domain and remaining PRS components in the one or more PRS components are unpunctured PRS components;
process jointly the unpunctured PRS components of the aggregated PRS that are aligned in time domain;
perform positioning measurements using the processed aggregated PRS from the one or more second wireless entities; and
transmit, via the at least one wireless transceiver, location information based on the positioning measurements.

18. The first wireless entity of claim 17, wherein the first wireless entity is the UE and the one or more second wireless entities comprise transmission reception points (TRPs) in a network entity and the one or more aggregated PRS comprise downlink (DL) aggregated PRS.

19. The first wireless entity of claim 17, wherein the configurations for the PRS associated with the one or more second wireless entities are received from a location server.

20. The first wireless entity of claim 17, wherein the plurality of frequency-domain bandwidths spanned by the single PRS resource are contiguous frequency-domain bandwidths.

21. The first wireless entity of claim 17, wherein the location information comprises the positioning measurements or a position estimation for the first wireless entity determined using the positioning measurements.

22. The first wireless entity of claim 17, wherein each PRS component from the same second wireless entity is transmitted on one or more different component carriers, bands, frequency layers, or bandwidths in a same band.

23. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the at least one wireless transceiver and the at least one memory and configured to:
receive configurations, via the at least one wireless transceiver, for positioning reference signals (PRS) associated with one or more second wireless entities;
receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
process jointly unpunctured PRS components of the aggregated PRS that are aligned in time domain;
perform positioning measurements using the processed aggregated PRS from the one or more second wireless entities; and
transmit, via the at least one wireless transceiver, location information based on the positioning measurements;
wherein the first wireless entity is the UE and the one or more second wireless entities comprise a second UE and the one or more aggregated PRS comprise sidelink (SL) aggregated PRS.

24. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the at least one wireless transceiver and the at least one memory and configured to:
receive configurations, via the at least one wireless transceiver, for positioning reference signals (PRS) associated with one or more second wireless entities;
receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
process jointly unpunctured PRS components of the aggregated PRS that are aligned in time domain;
perform positioning measurements using the processed aggregated PRS from the one or more second wireless entities; and
transmit, via the at least one wireless transceiver, location information based on the positioning measurements;
wherein the first wireless entity is a transmission reception point (TRP) and the one or more second wireless entities comprise the UE and the one or more aggregated PRS comprise uplink (UL) aggregated PRS.

25. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the at least one wireless transceiver and the at least one memory and configured to:
receive configurations, via the at least one wireless transceiver, for positioning reference signals (PRS) associated with one or more second wireless entities;
receive, via the at least one wireless transceiver, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource;
process jointly unpunctured PRS components of the aggregated PRS that are aligned in time domain;
perform positioning measurements using the processed aggregated PRS from the one or more second wireless entities; and
transmit, via the at least one wireless transceiver, location information based on the positioning measurements;
wherein at least one PRS component of at least one aggregated PRS is punctured or is not aligned with other PRS components in the time domain so that the PRS in the at least one PRS component is dropped in one or more symbols.

26. The first wireless entity of claim 25, wherein the at least one PRS component is punctured by one or more of having a different slot structure, collision with a synchronization signal block (SSB), collision with uplink symbols, collision with downlink symbols, or a combination thereof.

27. The first wireless entity of claim 25, wherein the at least one processor is further configured to leave unprocessed all remaining PRS components of the at least one aggregated PRS on the one or more symbols.

28. The first wireless entity of claim 25, wherein the at least one processor is further configured to leave unprocessed the at least one PRS component that is punctured and processing remaining PRS components separately on the one or more symbols.

29. The first wireless entity of claim 28, wherein the at least one processor is configured to process the remaining PRS components separately on the one or more symbols by being configured to process jointly the remaining PRS components.

30. The first wireless entity of claim 28, wherein the at least one processor is configured to process the remaining PRS components separately on the one or more symbols by being configured to process the remaining PRS components with an accuracy requirement that corresponds to each of the remaining PRS components separately.

31. The first wireless entity of claim 25, wherein the at least one processor is further configured to leave unprocessed the at least one PRS component that is punctured and processing remaining contiguous PRS components jointly on the one or more symbols.

32. The first wireless entity of claim 25, wherein the at least one processor is further configured to process unpunctured physical resource blocks (PRBs) in all PRS components jointly on the one or more symbols.

33. A method for supporting positioning of a user equipment (UE) in a wireless network performed by a first wireless entity, comprising:
receiving configurations for positioning reference signals (PRS) associated with one or more second wireless entities;
receiving one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof;
processing jointly the one or more PRS components for each aggregated PRS when the PRS components are configured with the same constraints and separately processing the one or more PRS components for each aggregated PRS when the PRS components are not configured with the same constraints;
performing positioning measurements using the processed one or more aggregated PRS from the one or more second wireless entities; and
transmitting location information based on the positioning measurements.

34. The method of claim 33, wherein the first wireless entity is the UE and the one or more second wireless entities comprise transmission reception points (TRPs) in a network entity and the one or more aggregated PRS comprise downlink (DL) aggregated PRS.

35. The method of claim 33, wherein the configurations for the PRS associated with the one or more second wireless entities are received from a location server.

36. The method of claim 33, wherein the first wireless entity is the UE and the one or more second wireless entities comprise a second UE and the one or more aggregated PRS comprise sidelink (SL) aggregated PRS.

37. The method of claim 33, wherein the first wireless entity is a transmission reception point (TRP) and the one or more second wireless entities comprise the UE and the one or more aggregated PRS comprise uplink (UL) aggregated PRS.

38. The method of claim 33, wherein the plurality of frequency-domain bandwidths spanned by the single PRS resource are contiguous frequency-domain bandwidths.

39. The method of claim 33, wherein the predefined number of symbols is 0 so that the PRS components are transmitted simultaneously.

40. The method of claim 33, wherein each PRS component from the same TRP is transmitted on one or more different component carriers, bands, frequency layers, or bandwidths in a same band.

41. A first wireless entity configured to support positioning of a user equipment (UE) in a wireless network, comprising:
an external interface comprising at least one wireless transceiver configured to wirelessly communicate with entities in the wireless network;
at least one memory; and
at least one processor coupled to the external interface and the at least one memory and configured to:
receive, via the external interface, configurations for positioning reference signals (PRS) associated with one or more second wireless entities;
receive, via the external interface, one or more aggregated PRS from the one or more second wireless entities, wherein each aggregated PRS comprise one or more PRS components transmitted from a same second wireless entity, wherein each PRS component transmitted from the same second wireless entity comprises a separate PRS resource associated with a contiguous frequency-domain bandwidth or comprises a plurality of frequency-domain bandwidths spanned by a single PRS resource, wherein PRS components in the aggregated PRS are configured with constraints comprising one or more of symbol indices that are not separated by more than a predefined number of symbols, slot indices that are not separated by more than a predefined number of slots, frames that are not separated by more than a predefined number of frames, subframes that are not separated by more than a predefined number of subframes, a same periodicity, a same comb type, a same number of symbols, a same quasi-colocation (QCL) information, start physical resource block (PRB) that is within a predefined threshold, a same subcarrier spacing, a same cyclic prefix (CP), muting configuration, and bandwidths that are within a predefined threshold, or a combination thereof;
process jointly the one or more PRS components for each aggregated PRS when the PRS components are configured with the same constraints and separately processing the one or more PRS components for each aggregated PRS when the PRS components are not configured with the same constraints;
perform positioning measurements using the processed one or more aggregated PRS from the one or more second wireless entities; and
transmit, via the external interface, location information based on the positioning measurements.

42. The first wireless entity of claim 41, wherein the first wireless entity is the UE and the one or more second wireless entities comprise transmission reception points (TRPs) in a network entity and the one or more aggregated PRS comprise downlink (DL) aggregated PRS.

43. The first wireless entity of claim 41, wherein the configurations for the PRS associated with the one or more second wireless entities are received from a location server.

44. The first wireless entity of claim 41, wherein the first wireless entity is the UE and the one or more second wireless entities comprise a second UE and the one or more aggregated PRS comprise sidelink (SL) aggregated PRS.

45. The first wireless entity of claim 41, wherein the first wireless entity is a transmission reception point (TRP) and the one or more second wireless entities comprise the UE and the one or more aggregated PRS comprise uplink (UL) aggregated PRS.

46. The first wireless entity of claim 41, wherein the plurality of frequency-domain bandwidths spanned by the single PRS resource are contiguous frequency-domain bandwidths.

47. The first wireless entity of claim 41, wherein the predefined number of symbols is 0 so that the PRS components are transmitted simultaneously.

48. The first wireless entity of claim 41, wherein each PRS component from the same TRP is transmitted on one or more different component carriers, bands, frequency layers, or bandwidths in a same band.

* * * * *